(12) United States Patent
Sevindik

(10) Patent No.: US 12,028,747 B2
(45) Date of Patent: Jul. 2, 2024

(54) METHODS AND APPARATUS FOR REDUCING COMMUNICATIONS DELAY

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 271 days.

(21) Appl. No.: 17/343,414

(22) Filed: Jun. 9, 2021

(65) Prior Publication Data
US 2022/0400405 A1  Dec. 15, 2022

(51) Int. Cl.
*H04W 28/06* (2009.01)
*H04L 47/2475* (2022.01)
*H04W 12/03* (2021.01)
*H04W 12/102* (2021.01)

(52) U.S. Cl.
CPC ......... *H04W 28/06* (2013.01); *H04L 47/2475* (2013.01); *H04W 12/03* (2021.01); *H04W 12/102* (2021.01)

(58) Field of Classification Search
CPC ... H04W 28/06; H04W 12/03; H04W 12/102; H04L 47/2475; H04L 63/164
See application file for complete search history.

(56) References Cited

U.S. PATENT DOCUMENTS

2020/0186507 A1* 6/2020 Dhanabalan .......... H04L 63/029

OTHER PUBLICATIONS

Cisco, IPsec (Internet Protocol Security), Feb. 12, 2021, Cisco, 35 Pages, https://networklessons.com/cisco/ccie-routing-switching/ipsec-internet-protocol-security.
Stephen Kent, Request for Comments (RFC) 4302 "IP Authentication Header", The Internet Society, Dec. 2005, 34 Pages.
Stephen Kent, Request for Comments (RFC) 4303 "IP Encapsulating Security Payload (ESP)", The Internet Society, Dec. 2005, 44 Pages.
Boris Lubarsky, Re-Identification of Anonymized Data, Apr. 2017, 10 Pages, 1 Geo. L. Tech. Rev. 202 (2017), Georgetown Law Technology Review.

(Continued)

*Primary Examiner* — Mandish K Randhawa
(74) *Attorney, Agent, or Firm* — Straub & Straub; Stephen T. Straub; Michael P. Straub

(57) ABSTRACT

The present invention relates to methods and apparatus for reducing delay while providing secure communications between nodes. An exemplary method embodiment includes a first node performing the steps of: identifying packets corresponding to a first communications session, the first communications session corresponding to a first application type; segmenting at least a first packet corresponding to the first communications session into at least a first packet portion and a second packet portion, the first packet including a first packet header and a first packet payload, the first packet portion including at least a portion of the first packet header, the second packet portion including at least a portion of the first packet payload; communicating, in encrypted form, the first packet portion from the first node to a security function node; and communicating, in unencrypted form, the second packet portion from the first node to the security function node.

20 Claims, 18 Drawing Sheets

(56) References Cited

OTHER PUBLICATIONS

Understanding VPN Ipsec Tunnel Mode and Ipsec Transport Mode—What's the Difference?, Downloaded Feb. 13, 2021, 4 Pages, https://www.firewall.cx/networking-topics/protocols/870-ipsec-modes.html.

Peter Loshin, IPsec (Internet Protocol Security), Downloaded Feb. 13, 2021, 8 Pages, TechTarget, https://www.techtarget.com/searchsecurity/definition/IPsec-Internet-Protocol-Security.

* cited by examiner

| FIGURE 10A |
| FIGURE 10B |
| FIGURE 10C |

METHODS AND APPARATUS FOR REDUCING COMMUNICATIONS DELAY

FIELD OF INVENTION

The present invention relates to methods and apparatus for reducing communications delay when providing packet communications services. The present invention also relates to methods and apparatus of operating a communications node, e.g., a wireless base station to provide secure backhaul communications services for user equipment devices to which it is providing services. The present invention further relates to methods and apparatus for providing secure backhaul services in 5G wireless networks such as new radio 5G Citizens Broadband Radio Service (CBRS) Wireless Networks. The present invention further relates to methods and apparatus for reducing latency or delay for communications between a service provider's node, e.g., a wireless base station and the service provider's core network.

BACKGROUND OF THE INVENTION

When a wireless service provider deploys a communications node, e.g., a wireless base station, e.g., and/or Citizen Broadband Radio Service Device (CBSD), the communications path between the deployed node, e.g., wireless base station, and the core network needs to be secured. A communications path or connection consisting of one or more communications links owned by the wireless service provider and not accessible to the public is such a secure communications path.

However, one of the main challenges that wireless service providers face during network deployment is the requirement to utilize an encryption protocol (e.g., Internet Protocol Security (IPSec with encryption)) to provide security on communications, e.g., backhaul communications, between a wireless base station, e.g., gNB and/or Citizen Broadband Radio Service Device (CBSD), and the core network if the connection or communications path between the wireless base station and the core network is unsecure. There are many instances in which a wireless service provider may not have a secure backhaul connection between the wireless base station and the core network at locations at which wireless base stations are deployed.

For example, in a small business deployment model, the wireless service provider does not control the cable service provider that the small business has available or prefers to use. Whenever a small business in which a wireless base station, gNB, is deployed uses a cable provider other than one owned and/or operated by the wireless service provider, then the wireless service provider must use an encryption protocol on the backhaul data before communicating it over the cable providers network. Typically, the wireless service provider creates an IPSec tunnel with encryption between the wireless base station and the wireless service provider's core network for use in communicating backhaul data. When IPSec tunnel mode is implemented the packet payload and the original Internet Protocol (IP) packet header are both encrypted and a new IP header (i.e., IPSec header) is added.

Similarly, issues arise in fixed wireless access (FWA) deployments. When a wireless service provider wishes to deploy and extend their fixed wireless access service coverage, then they may in some instances rent a fiber, optical or cable connection from another service provider if they do not have a fiber, optical or cable connection to their core network because for example they do not provide such services in that market. IPSec with encryption or another encryption security protocol is then used to secure the communication between the fixed wireless access base station and the wireless service provider's core network. However, one of the drawbacks is that IPSec and other encryption protocols introduce additional headers to the user data which the wireless base station, e.g., gNB, is sending and receiving to/from the wireless service providers core network which causes additional data latency/delay in both communication to the core network from the wireless base station and from the core network to the wireless base station.

With a promise or sometimes a contractual obligation of low latency data communications, wireless base stations such as for example, 5G gNB base stations which may be implanted as CBSDs cannot tolerate this additional latency; and therefore wireless service providers are seeking technical solutions for how to use security protocols with encryption such as IPSec while also reducing the latency introduced by the use of the security protocols with encryption such as IPSec.

From the above it should be appreciated that there is a need for new and/or improved methods and apparatus for providing secure communication services using encryption security protocols while reducing the amount of latency or delay introduced by using such protocols. There is also a further need for new and/or improved methods and apparatus for providing a delay or latency reduced secure backhaul communications from a service provider's wireless base station to a core network when the communications link or path is unsecure. There is a further need for new and/or improved methods and apparatus for reducing and/or minimizing delays and/or latency for backhaul communications between wireless base stations and the core network when the backhaul communications link between the wireless base station and the core network are not owned by the same service provider or is unsecure. There is a further need for new and/or improved methods and apparatus for minimizing and/or reducing delay for backhaul communications over unsecure communications paths. There is a further need for new and/or improved methods and apparatus for reducing and/or minimizing delays and/or latency for backhaul communications between a wireless base station and the core network when the backhaul communications path and/or connection is unsecure and an encryption protocol such as IPSec is utilized to secure the backhaul communications path or connection.

SUMMARY OF THE INVENTION

The present invention provides a technological solution of how to efficiently and effectively provide communications, e.g., from a first node, e.g., a wireless base station, to a second node, e.g., a network security function device, in a secure manner while reducing and/or minimizing the delay and/or latency of the communications. The present invention further provides new and/or improved methods and apparatus for reducing and/or minimizing communications delay and/or latency between two nodes which are utilizing encryption protocols. The present invention further provides new and/or improved methods and apparatus for minimizing and/or reducing delay for backhaul communications between a wireless base station and a core network device when the wireless base station and core network device are utilizing an encryption protocol such as IPSec to secure the backhaul communications path or connection. Various embodiments of the present invention include novel methods and apparatus to solve one or more of the problems identified above.

An exemplary method embodiment in accordance with the present invention includes performing the following steps: identifying packets at a first node corresponding to a first communications session, said first communications session corresponding to a first application type; segmenting, at the first node, at least a first packet corresponding to the first communications session into at least a first packet portion and a second packet portion, said first packet including a first packet header and a first packet payload, said first packet portion including at least a portion of said first packet header, said second packet portion including at least a portion of said first packet payload; communicating, in encrypted form, the first packet portion from the first node to a security function node; and communicating, in unencrypted form, the second packet portion from the first node to the security function node.

In some embodiments the step of segmenting, at the first node, at least a first packet corresponding to the first communications session into at least a first packet portion and a second packet portion includes segmenting the first packet to have a first packet portion having a first size that is less than or equal to a first number of bits and to have a second packet portion having a second size that is more than said first number of bits.

In some embodiments, the first packet portion includes only a header portion of said first packet.

In some embodiments, the first packet portion includes the header portion of said first packet and a first portion of the payload of said first packet.

In some embodiments, the second packet portion includes the payload portion of said first packet not included in said first packet portion, said payload portion of said first packet not included in said first packet portion including more bits of said payload portion than were included in said first packet portion.

In some embodiments, the step of communicating, in encrypted form, the first packet portion includes communicating the first packet portion using a secure communications tunnel which extends between the first node and the security function node.

In various embodiments, the step of communicating, in encrypted form, the first packet portion includes communicating the first packet portion with a first packet identifier.

In various embodiments, the step of communicating, in unencrypted form, the second packet portion includes communicating the second packet portion with the first packet identifier.

In some embodiments of the invention, the method further comprises the following additional steps: operating the security function node to receive the first packet portion in encrypted form; operating the security function node to receive the second packet portion in unencrypted form; operating the security function node to decrypt the encrypted first packet portion to produce a decrypted first packet portion; operating the security function node to reconstruct the first packet from the decrypted first packet portion and unencrypted second packet portion to form a reconstructed first packet; and operating the security function node to send the reconstructed first packet to a second end node which is an intended destination of the first packet, said second end node being an end node in the first communications session.

In some embodiments of the invention, the method further includes the steps of: identifying packets at the first node corresponding to a second communications session, said second communications session corresponding to a second application type; making a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communication path which does not include a secure tunnel. In some embodiments, the step of making said decision includes deciding to communicate second communications session packets to the security function node via a secure tunnel. In some embodiments, the method further includes operating the first node to communicate packets (e.g., complete packets including a received header and payload) corresponding to said second communications session to said security function node via a secure tunnel. In some embodiments the secure tunnel is an IPSec tunnel implementing encryption.

In various embodiments, the method further includes the steps of: operating the security function node to receive packets corresponding to the second communications session via said secure tunnel in encrypted form; operating the security function node to recover packets corresponding to the second communications session by decrypting the received packets corresponding to the second communications session; and operating the security function node to forward recovered packets corresponding to the second communication session to an end node of said second communications session.

In some embodiments, the method further comprises the step of making a decision based on the application type of the first communications session whether to communicate packets corresponding to the first communications session to said security function node via a secure tunnel or by splitting the packets and sending first portions of packets of the first communications session to the security function node via a secure tunnel and second portions of packets corresponding to the first communications session to the security function node via a communication path which does not include a secure tunnel. In some embodiments, the step of making said decision, based on the application type of the first communications session, includes deciding to communicate first communications session packets to the security function node by splitting the packets and sending first portions of packets of the first communications session to the security function node via a secure tunnel and second portions of packets corresponding to the first communications session to the security function node via a communication path which does not include a secure tunnel.

In various embodiments, the first node is a first wireless base station. In some embodiments, the first wireless base station is gNB wireless base station. In many embodiments, the first wireless base station is part of a 5G wireless network.

In some embodiments, the 5G wireless network is Citizens Broadband Radio Service (CBRS) wireless network; and the gNB wireless base station is a Citizens Broadband Radio Service Device (CBSD).

In some embodiments, the first node is a first wireless base station is a 5G Citizens Broadband Radio Service Device deployed inside a first building by a first customer or at a first fixed wireless access location.

In various embodiments, the security function node is a security gateway device located in a core network, said first node and said core network being owned and operated by a first service provider; and a first communications path between the first node and the security gateway device is owned by a second service provider different from the first service provider.

In some embodiments, the method further includes determining by the first node that communications between the first node and a core network are not secured (e.g., the communications path between the first node and the security function node or any other nodes of a core network are accessible to the public or owned by a service provider different than the service provider that owns the first node and the security function node.

In various embodiments, the first node is a wireless base station; the identified packets are backhaul communications data packets received from a first user equipment device to which the wireless base station is providing wireless services; and the first communications session is a backhaul data communications session.

In some embodiments, the wireless base station utilizes an IPSec encryption protocol to encrypt the first packet portion, said IPSec encryption protocol having been negotiated with the security function node prior to the wireless base station communicating the first packet portion in encrypted from to the security function node.

Various apparatus disclosed herein include a processor and memory, the memory including instructions which when executed by the apparatus control the apparatus to perform one or more of the steps and/or functions described in connection with the various embodiments described herein.

In an exemplary wireless communications system embodiment includes: a first wireless base station of a first wireless network including a first node, said first node including: a memory; and a first processor, said first processor controlling the first node to perform the following operations: (i) identifying packets at a first node corresponding to a first communications session, said first communications session corresponding to a first application type; (ii) segmenting, at the first node, at least a first packet corresponding to the first communications session into at least a first packet portion and a second packet portion, said first packet including a first packet header and a first packet payload, said first packet portion including at least a portion of said first packet header, said second packet portion including at least a portion of said first packet payload; (iii) communicating, in encrypted form, the first packet portion (e.g., the first packet header portion of the first packet and possibly a fraction of the first packet payload of the first packet) from the first node to a security function node; and (iv) communicating, in unencrypted form, the second packet portion from the first node to the security function node.

In some embodiments the operation of segmenting, at the first node, at least a first packet corresponding to the first communications session into at least a first packet portion and a second packet portion includes segmenting the first packet to have a first packet portion having a first size that is less than or equal to a first number of bits and to have a second packet portion having a second size that is more than said first number of bits.

In various embodiments, the first packet portion includes only a header portion of said first packet.

In some embodiments, the first packet portion includes the header portion of said first packet and a first portion of the payload of said first packet.

In some embodiments, the second packet portion includes the payload portion of said first packet not included in said first packet portion, said payload portion of said first packet not included in said first packet portion including more bits of said payload portion than were included in said first packet portion.

In various embodiments, the operation of communicating, in encrypted form, the first packet portion includes communicating the first packet portion using a secure communications tunnel which extends between the first node and the security function node.

In some embodiments, the operation of communicating, in encrypted form, the first packet portion includes communicating the first packet portion with a first packet identifier.

In some embodiments, the operation of communicating, in unencrypted form, the second packet portion includes communicating the second packet portion with the first packet identifier.

In some embodiments, the security function node includes a second processor, the second processor controlling the security function node to perform the following operations: receive the first packet portion in encrypted form; receive the second packet portion in unencrypted form; decrypt the encrypted first packet portion to produce a decrypted first packet portion; reconstruct the first packet from the decrypted first packet portion and unencrypted second packet portion to form a reconstructed first packet; and send (e.g., transmit) the reconstructed first packet to a second end node which is an intended destination of the first packet, said second end node being an end node in the first communications session.

In various embodiments the first processor further controls the first node to perform the following additional operations: identifying packets at the first node corresponding to a second communications session, said second communications session corresponding to a second application type; making a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communication path which does not include a secure tunnel.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

The current invention is applicable to networks including unsecure network paths which require the use of an encryption protocol to secure the communications along the unsecure network path. For example, the current invention is applicable to wireless networks, e.g., new radio 5G wireless networks and Citizens Broadband Radio Service (CBIS) networks, that provide wireless communications services, e.g., broadband services, to wireless devices, e.g., user equipment devices/mobile terminals such as wireless sensors, smartphones, cell phones, laptops, media players, vehicles including one or more wireless terminals such as sensors, controllers and communications devices. The present invention provides new and/or improved methods and apparatus for providing backhaul communications from a wireless base station to a core network in a secure manner while minimizing transmission delay latency. While the invention is explained using an exemplary 5G network such as Citizens Broadband Radio Service network, it should be understood that the invention is not limited to 5G networks or Citizens Broadband Radio Service networks and may be, and in some embodiments, can be implemented between communications nodes/devices requiring the use of an encryption protocol such as IPSec to secure the communications between the communications nodes/devices.

Figure 1:
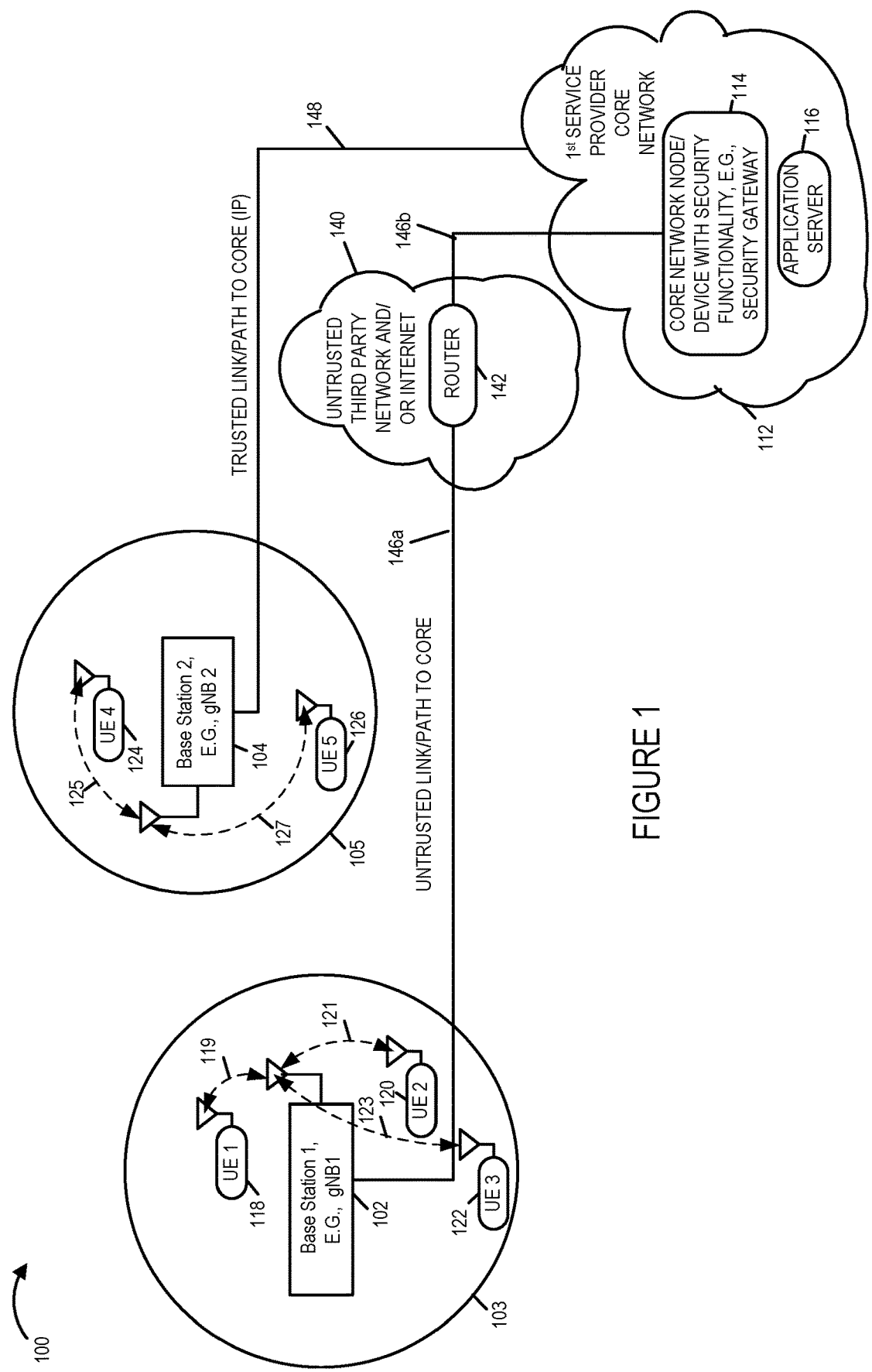
FIG. 1 illustrates an exemplary communications system in accordance with one embodiment of the present invention.

FIG. 1 is a drawing of an exemplary communications system 100 in accordance with an exemplary embodiment. Exemplary communications system 100 includes a plurality of base stations (base station 1 102, base station 2 104). In some embodiments, the base stations (102, 104) are gNB base stations. In some embodiments, the base stations (102, 104) are Citizens Broadband Radio Services Device (CBSD) base stations, e.g., gNB CBSD base stations. Each of the base stations (102, 104) has a corresponding wireless coverage area for user equipment (UE) devices, represented by circles (103, 105), respectively. The exemplary communications system 100 further includes a plurality of user equipment (UE) devices (UE 1 118, UE 2 120, UE 3 122, UE 4 124, UE 5 126). At least some of the UEs are mobile devices which move throughout the system 100 and can be coupled to different base stations at different times.

UE 1 118, UE 2 120 and UE 3 122 are coupled to base station 1 102 via wireless communications links (119, 121, and 123), respectively. UE 4 124 and UE 5 126 are coupled to base station 2 104 via wireless communications links (125 and 127), respectively.

Exemplary communications system 100 further includes a first service provider core network 112 including a core network node/device with security functionality, e.g., a security gateway, 114 and an application server 116. The core network node/device 114 has the capability to negotiate and implement security protocols and session, e.g., IPSec protocol sessions, with other devices, e.g., base station 1. In some embodiments, the core network node/device also includes access and mobility function and/or user plane functionality. In some embodiments these functionalities are includes in a separate device or devices than the core network node/device 114. For example, in access and mobility functionality (AMF) element/device and a user plane function (UPF) element/device. The application server is a node/device that provides services such as for example video services, communications services, gaming services. The core network 112 in this example is a 5G core network. Exemplary communications system 100 further includes an untrusted third party network and/or Internet 140 including routers 142, 144.

Base station 1 102 has an untrusted link/path 146 to core network 112 including: i) a first portion 146a of the path 146 between base station 1 102 and the router 142 and ii) a second portion 146b of the path 146 between router 142 and the core network 112. Because the backhaul path 146 is an untrusted path, e.g., due to traversing the untrusted third party network 140, measures need to be taken to secure the communications over backhaul path 146. This is done using security protocols with encryption, e.g., IPSec protocol with encryption, as will be explained in further detail below. Base station 2 104 has a trusted link/path 148 to core network 112, and normal Internet Protocol is used for communications over the trusted backhaul path 148. While only a few user equipment devices, base stations, and core network elements have been shown as a way to simplify the example, it should be understood that most systems implementing the present invention will include a large plurality of base stations, user equipment devices, and core network elements.

In the system of FIG. 1 the communications path also referred to as a backhaul connection includes untrusted link/path 146a, router 142 and untrusted communications path 146b. In the example of system 100 shown in FIG. 1, the links 146a, 146b, and router 142 are owned by a untrusted third party provider which is different from the service provider that owns and operates base station 1 102, base station 2 102 and the core network 112. In some embodiments, the link or path to the core network 112 from the wireless base station 102 is untrusted or unsecure because the links are accessible to the public.

In order to secure the communications between the wireless base station 102 and the elements or devices in the core network 112, security communications protocols can be implemented which utilize encryption such as for example IPSec security protocols with encryption. Even though the use of encryption security protocols can secure the communications when unsecure and/or untrusted links are utilized the use of such security protocols introduces additional latency and/or delay into data transmission between the wireless base station 102 and elements in the core network 112 such as the core network node/device with security function 114, which in some embodiments is a security gateway device. However, with many service providers promising and/or entering into agreements to provide low latency data communications especially with respect to 5G networks, the service providers implementing this networks can not and/or do not wish to tolerate this additional latency added by the use of the additional security protocols such as IPSec to secure the communications between nodes such as the wireless base station 102 and the core network device 114. As a result, service providers are seeking a solution to the technological problem of how to secure communications over untrusted/unsecure communications paths using security protocols such as IPSec while reducing and/or minimizing the delay introduced by the security protocol, e.g., IPSec protocol. The IPSec suite of protocols include IP Authentication Header (AH) Protocol Request for Comment 4302 and IP Encapsulating Security Payload (ESP) Protocol Request for Comment 4303 both dated December 2005. Both Request for Comment (RFC) 4302 and 4303 being specifications/standards published and maintained by the Internet Engineering Task Force. Each of the aforementioned RFC references being explicitly incorporated herein by reference in their entirety. Various embodiments of the present invention provide a solution to this technological problem as it introduces a way of reducing latency/delay introduced by the use of IPSec data communications with encryption in tunnel mode between nodes such as for example a wireless base station, e.g., gNB, 102 and the core network device 114 of core network 112 of system 100 shown in FIG. 1.

When an IPSec tunnel is created as discussed on page 19 in the December 2005 RFC 4303 IP Encapsulating Security Payload section 3.1.2 Tunnel Mode Processing, "the 'inner' IP header carries the ultimate (IP) source and destination addresses, while an 'outer' IP header contains the addresses of the IPsec 'peers', e.g., addresses of security gateways. Mixed inner and outer IP versions are allowed, i.e., IPv6 over IPv4 and IPv4 over IPv6. In tunnel mode, ESP protects the entire inner IP packet, including the entire inner IP header."

Figure 2:
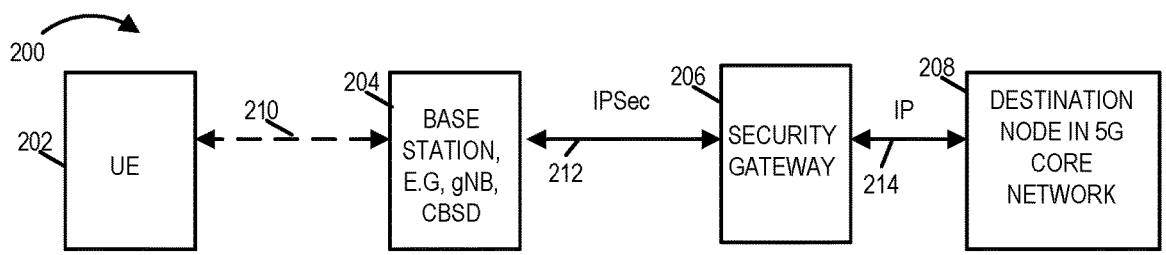
FIG. 2 illustrates a communications system operating in which the base station is utilizing IPSec protocol to encapsulate an entire IP packet before transmission to a security gateway in the core network.

FIG. 2 illustrates a system 200 which includes a UE 202, a base station, e.g., gNB, CBSD, 204, a security gateway 206, and a destination node 208. The security gateway 206 and destination node 208 being located in a core network owned and/or operated by the same service provider as the base station 204.

System 200 illustrates that a gNB base station in a communications system may have an untrusted link/path, e.g. cable connection backhaul, to its core network and thus use IPSec for communications over the untrusted link/path. It should be appreciated that having to use IPSec instead of normal IP increases transmission delay and can, and sometimes does, result in latency problems for a communications session. In the example of drawing 200 of FIG. 2, exemplary base station 1 204, e.g., gNB, has untrusted link/path for its cable connection backhaul to security gateway 206 of the core network, e.g., a 5G core network Internet Protocol data packets 210 are exchanged between the UE 202 and the base station 204 using an over the air communications link, i.e., wireless communications link. At the base station 204, the IP data packet are communicated from the wireless base station 204 to the core network security gateway 206 over the untrusted communications path using an IPSec tunnel and/or session 212 in which the received IP data packets are encrypted and encapsulated in IPSec packets. The security gateway 214 upon receiving the IPSec packets unencapsulates and decrypts the IP data packets and forwards these unencapsulated and decrypted IP data packets 214 to the destination node in the core network 208. The destination node 208 is determined by the security gateway based on IP packet header information included in each unencapsulated and decrypted IP data packet. Normal IP data packet communication is used between the security gateway 214 and the destination node because the communication path between these elements are secure and/or trusted as the elements are both part of the core network. In this example the entire IP data packet both the IP header and the IP packet body which includes the packet payload or user data are encapsulated and encrypted and communicated via the IPsec tunnel 212. The wireless base station encapsulates and encrypts the whole IP packet into a new secure IPSec packet structure to deliver the data to the security gateway. The security gateway upon receipt of the IPsec packet opens (unencapsulates and decrypts) the IPSec packet thereby obtaining the IP packet sent by the wireless base station. However, this introduces delay as the user data is considerably larger than the IP packet header. Without the IP packet header information the source and destination of the IP packet is not know and hence the value of the user data is neither particularly valuable. And, in many instances if large quantities of different user data packets are being transmitted at the same time it can be also even impede the ability to reconstruct the data packets as a third party will be unable to identify which packet payloads belong with which packets. Moreover, depending on the type of data being transmitted the value of the data and the need to secure it may be of less importance. For example, the interception of user video gaming data is not as important as the interception of voice or video call data.

Figure 3:
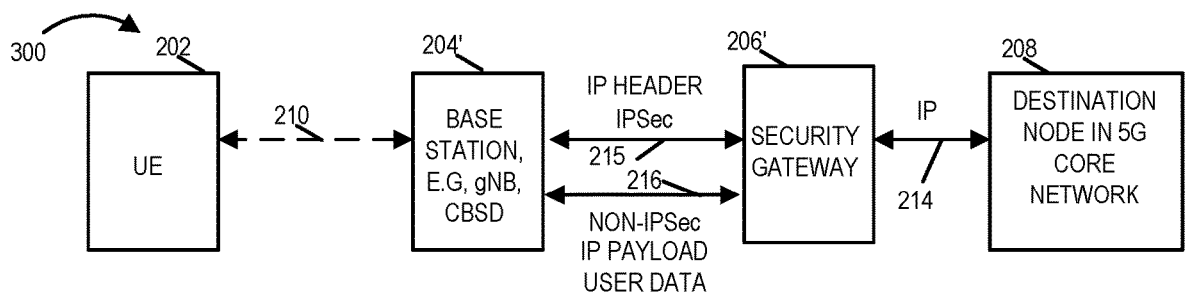
FIG. 3 illustrates a communications system in accordance with an embodiment of the present invention.

In view of the foregoing, one implementation in accordance with an embodiment of the invention is shown in FIG. 3.

FIG. 3 illustrates a system 300 in accordance with an embodiment of the present invention. System 300 includes a includes UE 202, a base station, e.g., gNB, CBSD, 204', a security gateway 206', and a destination node 208. The security gateway 206' and destination node 208 being located in a core network owned and/or operated by the same service provider as the base station 204'. In the example of system 300 of FIG. 3, exemplary base station 1 204', e.g., gNB, has untrusted link/path for its cable connection backhaul to its core network, e.g., security gateway 206' of the core network. The core network may be, and in some embodiments is, a 5G core network. Elements or steps identified with the same numbers in different figures are be considered the same or substantially the same and hence will not be discussed in detail in proceeding figures.

Internet Protocol data packets 210 are exchanged between the UE 202 and the base station 204' using an over the air communications link, i.e., wireless communications link. The base station 204' and the security gateway 206' after negotiates with the security gateway 206' establishes an IPSec tunnel and/or IPSec session 215. At the base station 204', each IP data packet received from UE 1 is segmented or deconstructed into a first portion and a second portion. The operation will now be discussed for a single first IP packet but the process is followed for each IP packet received from UE 1 202 by the base station 204'. In this example, the first portion includes the first IP packet header and the second portion includes the first IP packet body which includes the user data. The base station 204' generates an identifier a first identifier for the first IP packet and adds it to the first portion and the second portion of the first IP packet. The base station 204' transmits the first portion of the first IP packet to the security gateway 206' using the established IPSec tunnel and/or session over the untrusted link/path. This includes the base station 204' encrypting and encapsulating the first portion of the first IP packet with the added first identifier in accordance with the negotiated parameters for the IPSec tunnel and/or session 215. The second portion with the added first identifier is transmitted to the security gateway 206' from the base station 204' using a second communications session 216 which has been established between the base station 204' and the security gateway 206'. This second communications session 216 is a non-IPSec communication session. This second communication session may be, and in most embodiments is, a normal IP communications session. The second communications session in this example does not use encryption. The first portion of the first IP packet with the added first identifier and the second portion of the first IP packet with the added first identifier are each received at the security gateway 206'. The security gateway 206' upon receiving the IPSec packets unencapsulates and decrypts the IPSec packet and recovers from it the first portion of the first IP packet including the first identifier. The security gateway 206' stores the recovered first portion of the first IP packet including the first identifier in memory or a buffer for example at the security gateway 206'.

Upon receipt of the second portion of the first IP packet including the first identifier, the security gateway 206', identifies the first portion of the first IP packet and the second portion of the first IP packet using the first packet identifier. The security gateway 206' then reconstructs the first IP packet from the first portion and the second portion of the first IP packet after removing the first identifier from each portion, e.g., by combining the two portions.

The IPSec packet including the first portion of the first IP packet and the first identifier is much smaller in size than the second portion of the first IP packet and the first identifier. This is so because the second portion incudes the packet payload (user data). Furthermore, even though there is additional delay introduced by the use of the IPSec tunnel/session with encryption and encapsulation and decryption and decapsulation the first portion will arrive and be processed in advance of the second portion.

After the security gateway has reconstructed the first IP packet it transmits it to the destination node 208 in the core network 208. The destination node 208 is determined by the security gateway based on the first IP packet header information included in the first portion of the first IP packet. This process is repeated for each IP packet received from the UE 1 202 and being sent to the destination node 208. The wireless base station 204' generates an identifier for each IP packet so that the different first and second IP packet portions belonging to the different IP packets can be identified by the security gateway 206'. In some embodiments, the base station 204' generates the identifier using a random number generator so that it is more difficult for someone who intercepts a second packet portion to determine which other second packet portions go together when multiple second packet portions from multiple different packet streams are being transmitted using the same second communications session. While in the above example, the first portion of the IP packet included the IP packet header and the second portion of the IP packet included the IP packet body/payload with the user data, in some embodiments, the first portion may include the IP packet header and portions of the packet body/payload/user data. The amount of the portions of the packet payload being smaller than a first amount which would cause a delay greater than a first threshold value.

It should be understood that some of the packet user data may be sent through the IPSec tunnel/session, the amount should remain small so that the delay introduced by the additional user data is below the service provider required threshold. In some embodiments, a portion of the IP header information may be included in the second portion. The IP source address and IP destination address however will not be included in their entirety in the second portion as this information is to be protected. In various embodiments, the determination of whether to use this method or not on a received stream of IP packets from the UE 1 202 is determined based on the data type, e.g., gaming data vs. call data, and/or whether the data type has been classified or determined as a data type wherein the entire IP packet both header and payload should be sent via a secure IPSec tunnel or whether on a portion of the IP packet, e.g., IP packet header should be sent via a secure IPSec tunnel. The use of a secure IPSec tunnel wherein the entire IP packet is encrypted and encapsulated is sometime referred to herein as using full IPSec mode of operation while the use of a secure IPSec tunnel for only a portion of an IP packet is referred to using partial IPSec mode of operation. Data types for which a partial IPSec mode of operation may be implemented by the wireless base station and security gateway are gaming data type and movie downloads. For example with respect to video gaming data there is a large amount of data that is being communicated, it is time critical, and security of the data isn't that important or critical. Data that may be classified or determined as a data type wherein full IPSec mode of operation is to be used may include for example call data, bank transactions and/or other commercial transactions wherein the entire IP packets of a packet stream are to be sent via an IPSec protocol tunnel. With respect to call data, bank transactions and/or other commercial transactions the security of the security of the data may be more important than the delay introduced by the full IPSec mode of operation.

In some embodiments, customers, e.g., the user equipment device owners, can configure there devices or applications on their devices to indicate whether full IPSec mode of operation or partial IPSec mode of operation is to be used when data is received from the devices. For example a gaming application may indicate that the data associated with the gaming activity may be communicated using partial IPSec mode of operation. In some embodiments, the IP packets received by the wireless base station may include an indicator as to whether full or partial IPSec mode of operation is to be utilized in connection with the IP packet.

While the operation of the system 300 has been explained in direction of the IP packets being sent to a destination node in the core network the destination node in the core network can originate IP packets and send them to the UE 1 via the security gateway 206' the wireless base station 204' using the same method, e.g., the IP packet is segmented into a first portion, e.g., IP header, and a second portion, e.g., IP payload, an identifier is added to each portion and then the first portion is transmitted over the untrusted path using the IPSec tunnel/session and the second portion is transmitted over the untrusted path using the non-IPSec session, e.g., a normal IP communications session. The use of this method reduces the delay/latency introduced by IPSec and/or other security protocols by reducing the usage of the IPSec protocol and/or other security protocol to a smaller amount of data which is less than the processing time to deconstruct and reconstruct the IP packets by the wireless base station and the security gateway.

The procedures/steps of an exemplary method in accordance with one embodiment of the present invention will now be discussed in connection with system 100 illustrated in FIG. 1.

The base station 1 102 is implemented as a gNB CBSD base station. The base station 1 102 being a CBSD base station connects to a Spectrum Access System not shown in FIG. 1 and is granted or allocated spectrum for use in communicating with the UE devices which are in its coverage area 103 which include UE 1 118, UE 2 120 and UE 3 122.

The base station 1 102 connects with core network 112 which carries data from the Internet to the base station 1 102 and from the base station 1 102 to the Internet. The core network 112 in this example is a 5G core network. The core network 112 and the wireless base station 1 102 are owned and operated by the same service provider.

The base station 1 102 and core network via core network node/device 114 both support IPSec tunnel mode with encryption, e.g., IPSec sessions.

The communications path (link 146a, router 142, link 146b) between the base station 1 102 and the core network 112 (e.g., core network node 114 or application server 116) is not secure, e.g., untrusted links or elements in the communications path between the base station 1 120 and the core network 112. The securing the communications path between the base station 1 102 and the core network a priority and/or requirement of service provider. In some embodiments, the fact that communications path between the base station 1 102 and the core network 112 is known at the time of deployment. In some other embodiments, the base station 1 102 determines that the communications path between the wireless base station 1 102 and the core network 112 is unsecure, e.g., by received a request to establish a secure connection using a security protocol such as IPSec from a core network device, e.g., core network node 114 in response to request to establish an IP session with an entity/device in the core network 112.

An IPSec session is established between the base station 1 102 and core network node/device with security functionality 114 using IPSec tunnel mode of operation.

For traffic types which are not delay sensitive, the base station 1 102 uses full IPSec mode of operation to send data to the core network 112 and to receive data from the core network 112. As previously discussed in full IPSec mode of operation encryption is applied to both the IP header and IP body (user data part) while encapsulating the entire IP packet.

For traffic types that are delay sensitive, the base station 1 102 send the IP packet to the core network 112 and receives IP packets from the core network 112 using partial IPSec mode of operation. In the partial IPSec mode of operation as previously discussed a first portion of an IP packet (e.g., the IP packet header which includes IP source and IP destination addresses) is sent using IPSec and hence this first portion is encrypted and encapsulated in an IPSec packet while a second portion of the IP packet (e.g., the IP packet body which includes the user data) is communicated using a non-IPSec session, e.g., normal IP packet communications session which does not utilize encryption and hence does not have the added delay of use of the IPSec encryption and encapsulation operations. In order to use this method, the sender (base station 1 102 for communications to the core network 112 and core network node 114 for communications from the core network node 114) adds an identifier to both the first portion and the second portion of the IP packet. The identifier may be a marker which says or indicates that "first portion of IP packet, e.g., IP packet header, belongs to traffic A" and "the second portion of IP packet, e.g., IP packet body belongs to traffic A". The identifier may be, and in some embodiments is a parameter added to the first packet portion and the second packet portion allowed the two portions of the IP packet to be matched by the receiving entity. In some embodiments, the identifier is a small number or metadata used for matching the two portions of the IP packet. For example, in some embodiments, the identifier is a number 1 byte or 8 bits long.

The transmission latency of the first portion (e.g., which includes the IP header information) is smaller than the transmission latency of the second portion (e.g., which includes the IP body including the user data) since the IP header is very small compared to user data. When the receiver, e.g., the core network node 114 when the sender is the base station 1 102, receives the first portion of the IP packet it places it in a buffer until the corresponding second portion of the IP packet is received. The receiving node or device (the core network node 114 when the sender is the base station 1 102) uses the identifier added to first portion of the IP packet and the second portion of the IP packet to match the first portion with the corresponding second portion of the IP packet. The receiver matches the second portion of the IP packet with the corresponding first portion of the IP packet using the identifiers included in the first and second portions of the IP packet or matches the first portion of the IP packet with the corresponding second portion of the IP packet using the identifiers included in the first and second portions of the IP packet. Once the first and second portions of the IP packet have been identified based on the identifiers included the first and second portions of the IP packet, the receiver reconstructs the IP packet from the first and second portions of the IP packet. Reconstructing the IP packet in this case includes from the identifier added to the first and second portions of the IP packet before recombining the first and second portions of the IP packet. Once the IP packet has been reconstructed, the receiver, e.g., the core network node 114, can transmit the reconstructed IP packet towards its destination address. In some embodiments, the first portion of the IP packet consists of the IP header of the packet and the second portion of the IP packet consists of the IP body of the IP packet. Furthermore, it is to these first and second portions of the IP packet the identifier is added.

Figure 12:
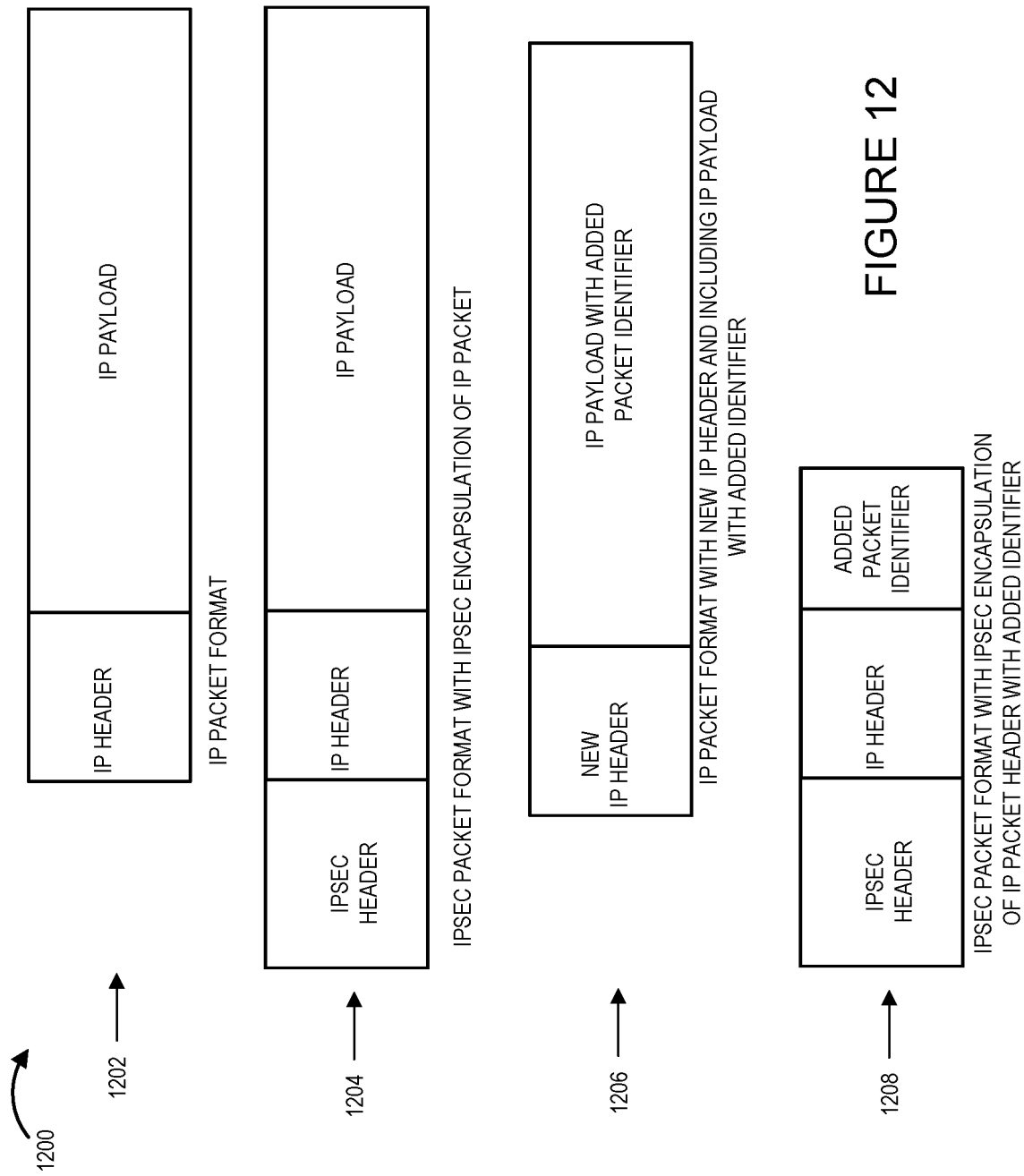
FIG. 12 illustrates simplified drawings of an IP packet, IP packet encapsulated in an IPSec packet, an IP packet including an IP payload of another IP packet and an added packet identifier identifying the source IP packet to which the IP payload corresponds, and IPSec packet encapsulating an IP header and added packet identifier identifying the source IP packet to which the IP header corresponds.

Drawing 1200 of FIG. 12 illustrates a simplified drawing of an original IP packet 1202. The original IP packet has been described in terms of having two fields an IP header field and an IP payload field. The IP header field would include a number of sub-fields including source IP address and destination IP address. The IP payload field would include user data field. The IPSec packet 1204 illustrates a simplified drawing of how the IPSec packet encapsulates the original IP packet and includes a new IPSec header. When the entire original IP packet has been encapsulated this has been referred to as full IPSec mode. The IP packet 1206 illustrates a simplified IP packet that includes the second portion of an IP packet which includes the IP packet payload and the added identifier when operating in the partial mode of operation. The IP packet 1206 has a new IP header as it does not include the original IP header with original IP source and destination information. Instead, the new header includes the peer IP source and IP destination which the example of FIG. 1 is base station 1 102 and core network node/device 114. The IPSec packet 1208 illustrates a simplified drawing of how the IPSec packet encapsulates the original IP packet header and the added identifier when operating in the partial IPSec mode of operation and the first portion of the IP packet is the IP packet header.

Figure 13:
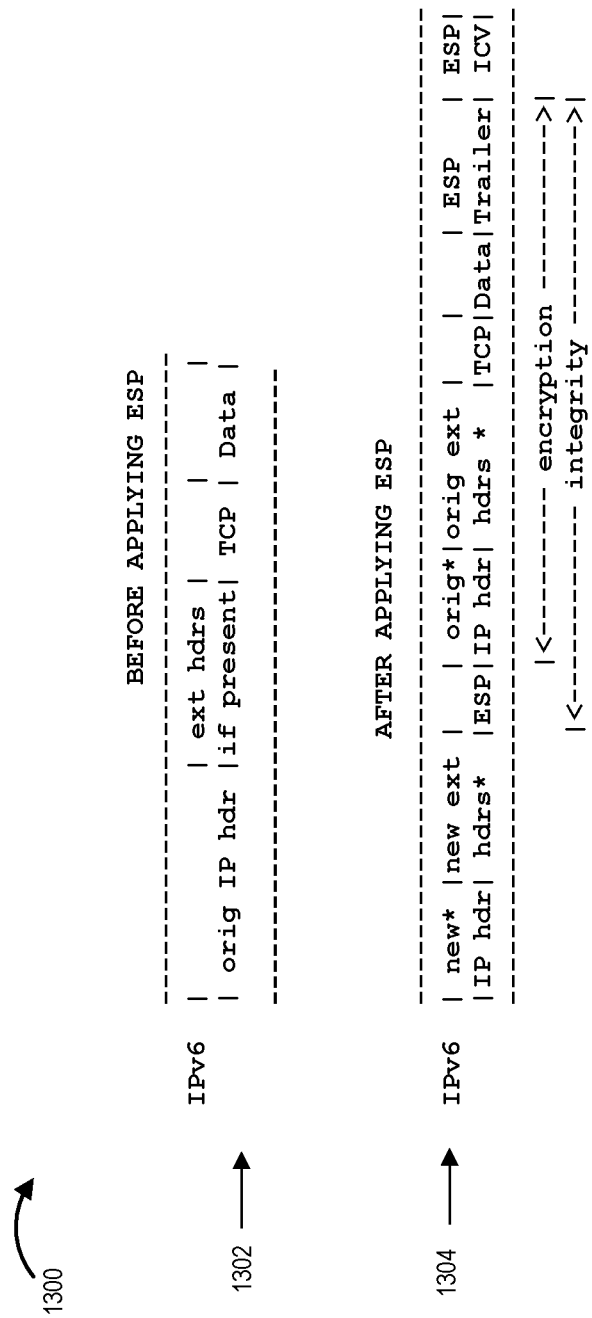
FIG. 13 illustrates a detailed drawing from RFC 4303 which illustrates an IP V6 packet and the IPSec packet which includes an encrypted and encapsulated IP V6 packet.

Drawing 1300 of FIG. 13 illustrates a portion of drawing RFC 433 December 2005 IP Encapsulating Security Payload (ESP) Section 3.1.2 Tunnel Mode Processing. The drawing 1300 shows fields of an original Internet Protocol (IPV6) Packet 1302 before IPSec ESP is applied and the fields of an IPSec packet 1304 after IPSec ESP has been applied. The drawing shows how the entire original IP packet has been fully encrypted and encapsulated in the IPSec packet including the original IP header and data. This has been referred to as full IPSec mode of operation. In one exemplary embodiment when partial IPSec mode is utilized, the IPSec packet includes the first portion of the original IP packet which in this example includes the following following fields: the original IP header, original header extensions if any are present, and the TCP field and the added identifier which may be included in the data field. In some embodiments, the added identifier is included in the IP header or extension field. Furthermore, in this example the data field that is the user data of the original IP packet is not included in the IPSec packet but is sent separately apart from the IPSec packet in a normal IP packet which includes an identifier that can be used by the receiving entity to identify the corresponding IPSec packet can be identified by the receiving entity.

The original IP header includes the original source IP address and the original destination IP address which has been encrypted and encapsulated in the IPSec packet.

Figure 4:
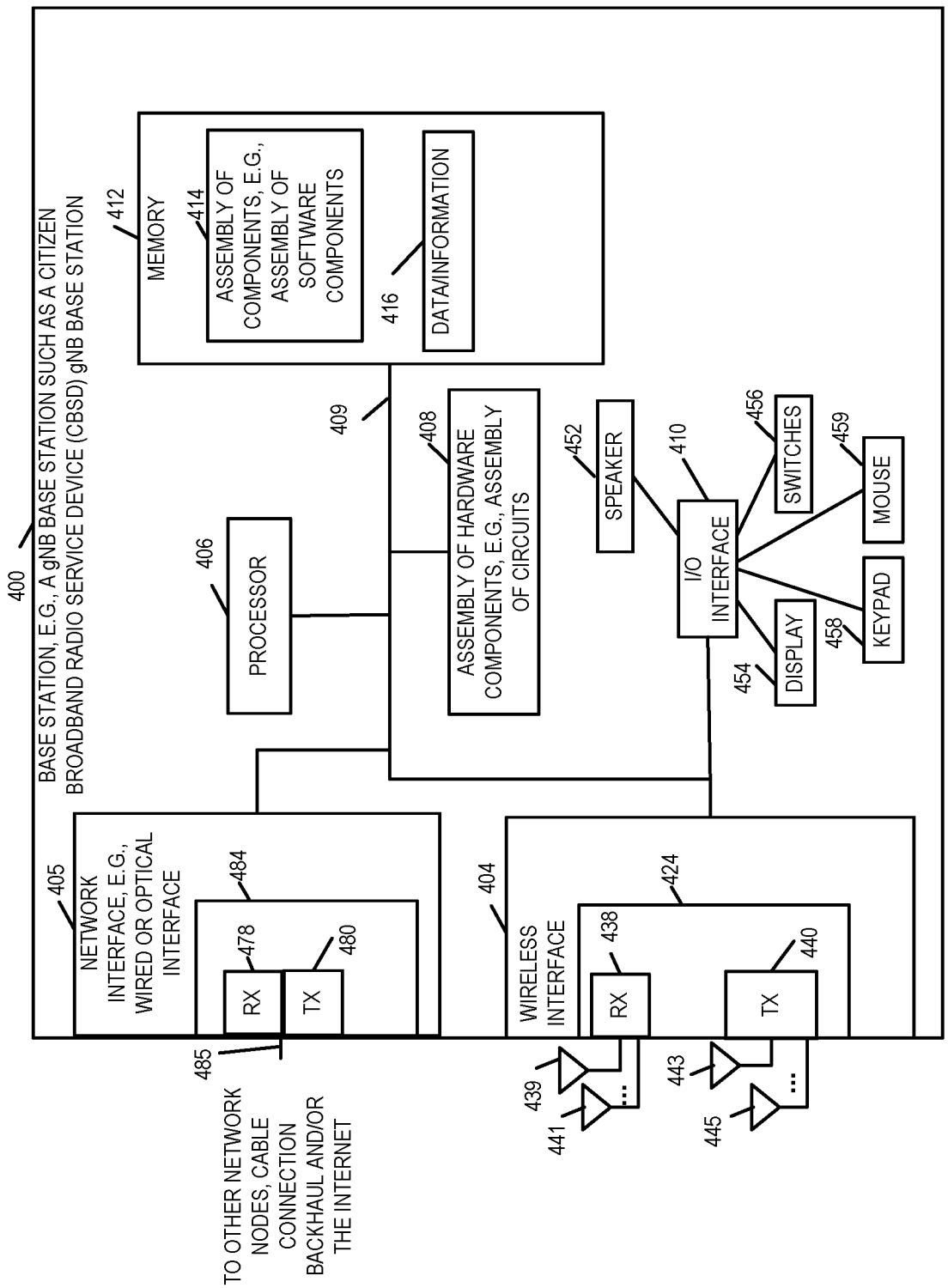
FIG. 4 is a drawing of an exemplary base station, e.g., a gNB base station such as a Citizens Broadband Radio Services Device (CBSD) gNB base station implemented in accordance with an exemplary embodiment.

FIG. 4 is a drawing of an exemplary wireless base station 400, e.g., a gNB base station such as a Citizens Broadband Radio Service Device (CBSD) gNB base station in accordance with an exemplary embodiment. Exemplary wireless base station 400, e.g., gNB 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 includes a first wireless interface 424. In some embodiments the base station includes a plurality of wireless interfaces. The wireless interfaces are used to communicate with the wireless devices including mobile wireless terminals and fixed wireless terminals. The first wireless interface 424 is used for example to communicate with wireless devices, e.g., a mobile terminal such as MT 1 104. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a mobile terminal, a fixed terminal, a CPE device, a CBRS user equipment device, etc. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a mobile terminal, a fixed terminal, a CPE device, a CBRS user equipment device, etc. The wireless base station network interface 405 includes an output connector 485. The network interface 405 may be, and typically is, used to couple the wireless base station to other network nodes, a backhaul communications link to a core network, a SAS system, other networks, e.g., internet, or other wireless base stations.

Memory 412 includes an assembly of components 414, e.g., an assembly of software components, and data/information 416.

In some embodiments, one or more of the wireless base stations discussed and/or shown in the Figures and/or in connection with the methods discussed herein including wireless base station 102 shown in FIGS. 1 and 204' shown in FIG. 3 are implemented in accordance with the wireless base station 400.

Figure 5:
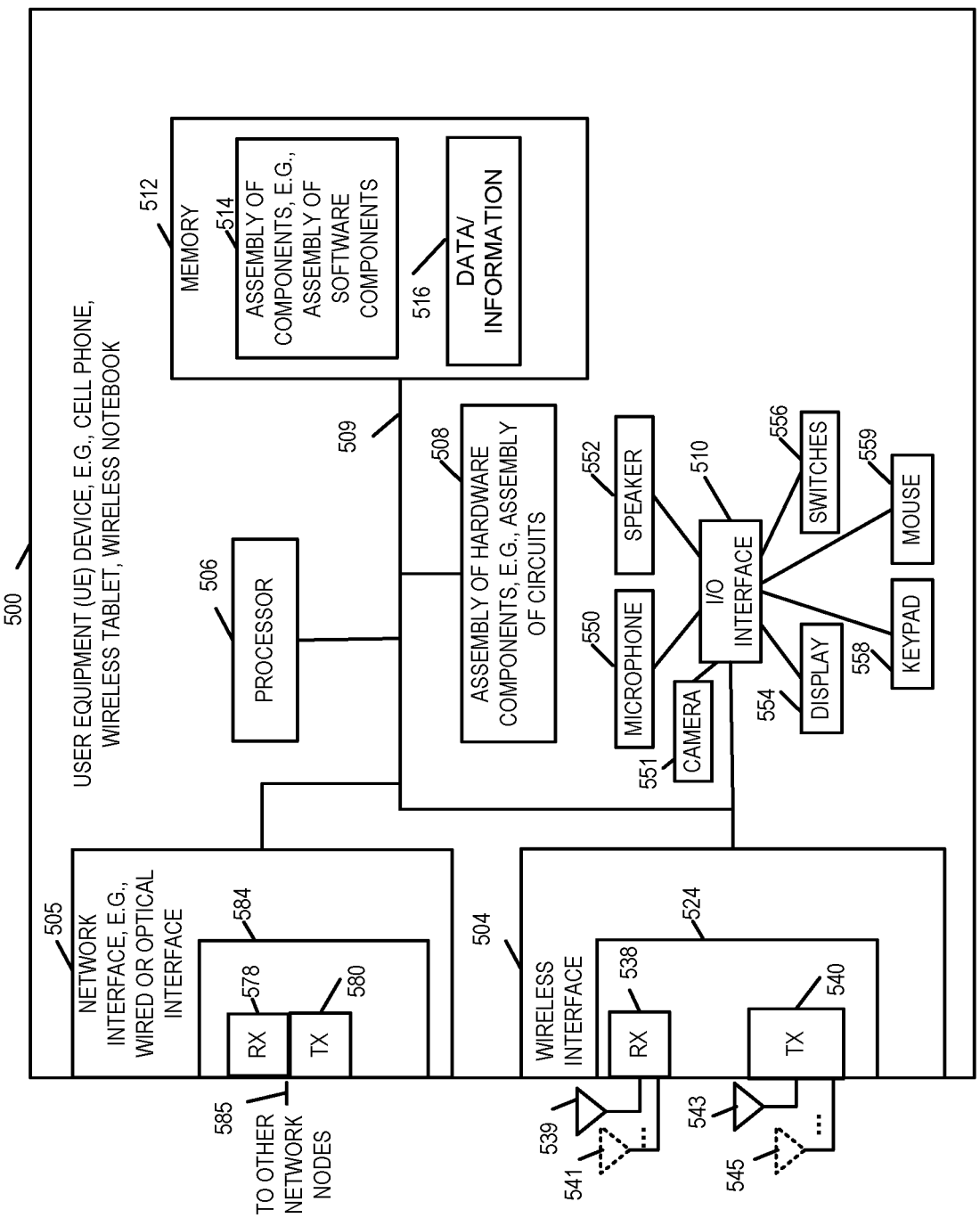
FIG. 5 is a drawing of an exemplary user equipment (UE) device, e.g., a cell phone, wireless table, or wireless notebook, implemented in accordance with an exemplary embodiment.

FIG. 5 is a drawing of an exemplary user equipment (UE) device 500 e.g., fixed or mobile wireless such as for example, a cell phone, smartphone, wireless tablet, wireless notebook, or sensor devices implemented in accordance with an exemplary embodiment. Exemplary UE device 500 is, e.g., any of the UEs (UE 1 118, UE 2 120, UE 3 122, UE 4 124, UE 5 126) of system 100 and UE 1 202 of system 200 and 300 shown in or described with respect to FIGS. 1-3 and/or a UE implementing steps of the exemplary methods discussed herein, e.g., method 1000 shown in FIG. 10 and method 1100 shown in FIG. 11.

Exemplary UE device 500 includes a processor 902, e.g., a CPU, a wireless interface 506, a network interface 505, an assembly of hardware components 508, e.g., an assembly of circuits, an I/O interface 510 and memory 512 coupled together via a bus 509 over which the various elements may interchange data and information. UE device 500 further includes a plurality of input/output devices (microphone 550, speaker 552, camera 551, display 554, e.g., a touchscreen display, keypad 558, mouse 559, and switches 556) via which an user of device 500 may enter input, e.g. data/information, selections, requests, commands, controls, etc. and/or receive output, e.g., displays of data/information, status and results. The plurality of input/output devices (550, 551, 552, 554, 556, 558, 559) are coupled, via I/O interface 510 to bus 509, facilitating communication with other elements, e.g., interfaces 504, 505, the processor 506, assembly of hardware components 508 and memory 512, within UE device 500.

Wireless interface 504 includes a wireless receiver 538 and a wireless transmitter 540. In some embodiments, the wireless receiver 538 and the wireless transmitter 540 are included as part of a transceiver 524. Wireless receiver 538 is coupled to one or more receive antennas (receive antenna 1 539, . . . , receive antenna N 541), via which the UE 500 can receive wireless signals, e.g. wireless signals from base stations. Wireless transmitter 540 is coupled to one or more transmit antennas (transmit antenna 1 543, . . . , transmit antenna N 545, via which the UE device 500 can transmit wireless signals, e.g. wireless signals to base stations.

Network interface 505, e.g., a wired or optical interface includes a receiver 578 and a transmitter 580. In some embodiments, the receiver 578 and transmitter 580 are included as part of a transceiver 584. The receiver 578 and transmitter 580 are coupled to output connector 585 which couples the network interface 505 to other devices, e.g. when the UE device is at a fixed location and attached to a wired or optical network.

Memory 512 includes an assembly of components 514, e.g., an assembly of software components, such as software routines, subroutines, modules and/or applications, and data/information 516.

Figure 6:
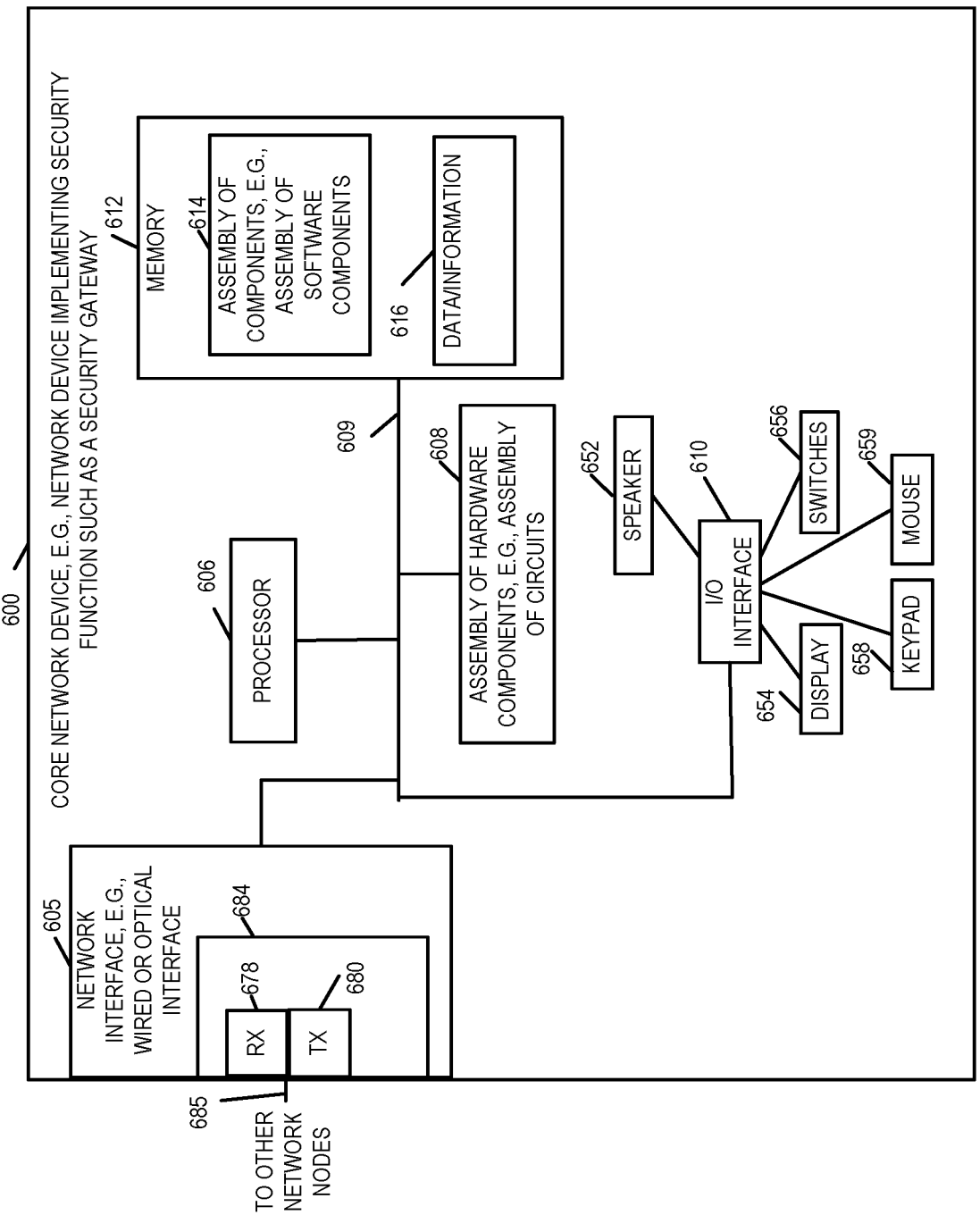
FIG. 6 is a drawing of an exemplary core network device, e.g., a security function node implemented in accordance with an exemplary embodiment.

FIG. 6 is a drawing of an exemplary core network device 600, e.g., a security gateway, an access and mobility management function (AMF) server, an user plane function (UPF) server or an application server, implemented in accordance with an exemplary embodiment. Core network node/device 114 and application server 116 shown in system 100 may be implemented in accordance with core network device 600. The security gateway 206' shown in FIG. 3 may be, and in some embodiments is implemented in accordance with core network device 600. Any of the core network devices shown in or described with to the exemplary systems described herein and in the Figures and/or which implement one or more steps of the exemplary methods discussed herein including the methods 1000 and 1100 may be implemented in accordance with core network device 600 illustrated and described in connection with FIG. 6.

Exemplary core network device 600 includes a processor 606, e.g., a CPU, a network interface 605, an assembly of hardware components 608, e.g., an assembly of circuits, an I/O interface 610 and memory 612 coupled together via a bus 609 over which the various elements may interchange data and information. Core network device 600 further includes a plurality of input/output devices (speaker 652, display 654, e.g., a touchscreen display, keypad 658, mouse 659, and switches 656) via which an operator may enter input, e.g. commands, controls, etc. and/or receive output, e.g., displays of status and results. The plurality of input/ output devices (652, 654, 656, 658, 659) are coupled, via I/O interface 610 to bus 609, facilitating communication with other elements, e.g., interface 605, the processor 606, assembly of hardware components 608 and memory 612, within core network device 600.

Network interface 605, e.g., a wired or optical interface includes a receiver 678 and a transmitter 680. In some embodiments, the receiver 678 and transmitter 680 are included as part of a transceiver 684. The receiver 678 and transmitter 680 are coupled to output connector 685 which coupled the network interface 605 to other network nodes, cable connection backhauls, third party networks, and/or the Internet.

Memory 612 includes an assembly of components 614, e.g., an assembly of software components, such as software routines, subroutines, modules and/or applications, and data/information 616.

Figure 7:
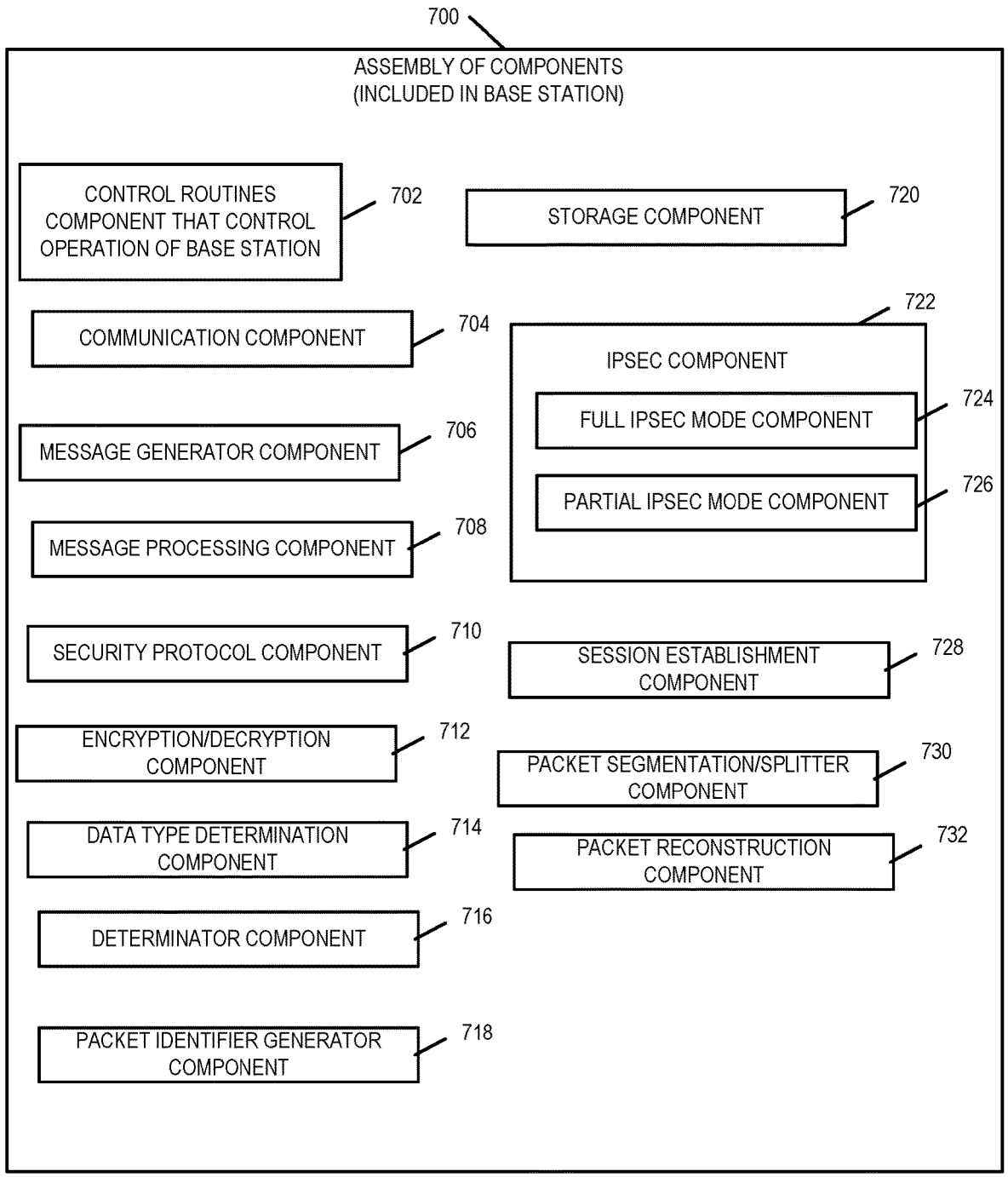
FIG. 7 is a drawing of an exemplary assembly of components which may be, and in some embodiments is, included in an exemplary wireless base station in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a security protocol component 710, an encryption/decryption component 712, a data type determination component 714, a determinator component 716, a packet identifier generator component 718, a storage component 720, an IPSec component 722, a session establishment component 728, a packet segmentation/splitter component 730, and a packet reconstruction component 732. In some embodiments, the IPSec component 722 includes a full IPSec mode sub-component 724 and a partial IPSec mode sub-component 726.

The control routines component 702 is configured to control operation of the wireless base station. The communications component 704 is configured to handle communications, e.g., transmission and reception of messages, processing of messages, establishment of communications sessions, and protocol signaling for the wireless base station, IP packet transmission and reception, negotiations of security protocols and parameters to be used for sessions including full IPSec mode of operation and partial IPSec mode of operation. The message generator component 706 is configured to generate messages for transmission to other devices including full IPSec packet messages, partial IPSec packet messages, IP packet messages. The message processing component 708 is configured to process received messages and/or IP packets and is sometimes a sub-component of communications component 704.

The security protocol component 710 is sometimes a sub-component of the communications component. The security protocol component 710 is configured to negotiate and implement different security protocols which are utilized by the base station to secure communications on untrusted or non-secure connection with another device or endpoint, e.g., a security function node or security gateway in a core network. One of the security protocols that the security protocol implements is the IPSec ESP security protocol. The encryption/decryption component 712 encrypts messages, packets, data, and information and decrypts encrypted messages, packets, data and information. The encryption/decryption component 712 is sometimes a sub-component of the communication component 704 and/ or the security protocol component 710. The data type determination component 714 makes data type determinations on received data. The data type determination component 714 determines whether received data from a user equipment data is delay sensitive or not delay sensitive. The data type determination component 714 determines whether data received from a UE is one of the following types: gaming data, commercial transaction data, call data. The data type determination component 714 determines whether data is a data type to be communicated using full IPSec mode or partial IPSec mode. In some embodiments, the data type determination component is a sub-component of the determinator component 716. The determinator component 716 makes data type determinations, determinations as to whether data is to be transmitted in full IPSec mode or partial IPSec mode, determinations as to whether first portions of IP packets match second portions of IP packets based on an identifier included in or with the first portion of an IP packet and the second portion of an IP packet, determinations as to which portions of an IP packet are to be communicated using IPSec with encryption or another security protocol using encryption and which portion of an IP packet are to be communications using non-IPSec or without encryption, determinations of identifiers to added to portions of IP packets to identify the portions of the IP packets belong to the same IP packet, determinations as to whether an connection between the base station and another node/device and/or core network is untrusted and/or not secured.

The packet identifier generator component 718 generates an identifier that is added to different portions of a packet so that the different portions of the packet can later be determined or identified as corresponding to the same packet.

The storage component 720 controls the storage and retrieval of items including information, data, and messages to memory and buffers included in or coupled to the base station.

The IPSec component 722 is sometimes a sub-component of the communications component 704 and/or the security protocol component 710. In some embodiments, the IPSec component 722 includes a full IPSec mode sub-component 724 and a partial IPSec mode sub-component 726. The IPSec component determines the when partial IPSec mode of communication is to be utilized with respect to the communication of IP packets of an IP packet stream and when full IPSec mode of communication is to be utilized with respect to communicating IP packets of an IP packet stream. The IPSec component 722 also negotiates with far end devices the implementation of the IPSec protocol parameters for IPSec sessions when IPSec tunnel mode of communication is to be used for communication in connection with IP packets as well as whether full IPSec mode of communication is to be used or partial IPSec mode of communication is to be used. The IPSec component establishes IPSec sessions and/or IPSec tunnels with far end nodes/devices including nodes/devices in the core network, e.g., a security gateway which is part of the core network. The full IPSec mode component establishes IPSec tunnels and/or sessions utilized to communicate IP packets securely in encrypted format in IPSec packets to peer network nodes/devices, e.g., security gateway in the core network. The partial IPSec mode component establishes IPSec tunnels and/or sessions as well as non-IPSec sessions for the communication of IPSec and non-IPSec packets using the partial IPSec mode of communication. The full IPSec mode component 724 implements the steps, functions and procedures to set up and communicate with other devices using IPSec EAS protocol. The partial IPSec mode component 726 implements the steps, functions and procedures to set up and communicate with other devices using IPSec EAS protocol for a first portion of IP packets of an IP packet stream and non-IPSec session or regular IP packet session for a second portion of IP packets of an IP packet stream.

The session establishment component 728 is sometimes a sub-component of the communications component. The session establishment component establishes session between the base station and other devices including negotiations and protocol parameters to be utilized during the session.

The packet segmentation/splitter component 730 segments or splits a packet into different segments or portions. The packet segmentation/splitter component 730 segments and/or splits IP packets into a first portion and a second portion when partial IPSec mode of communications is being utilized in connection with an IP packet stream.

The packet reconstruction component 732 reconstructs and/or reassembles a packet from different packet portions or segments such as those received from other devices at the base station when the base station is operating in partial IPSec mode of operation with respect to an IP packet stream.

Figure 8:
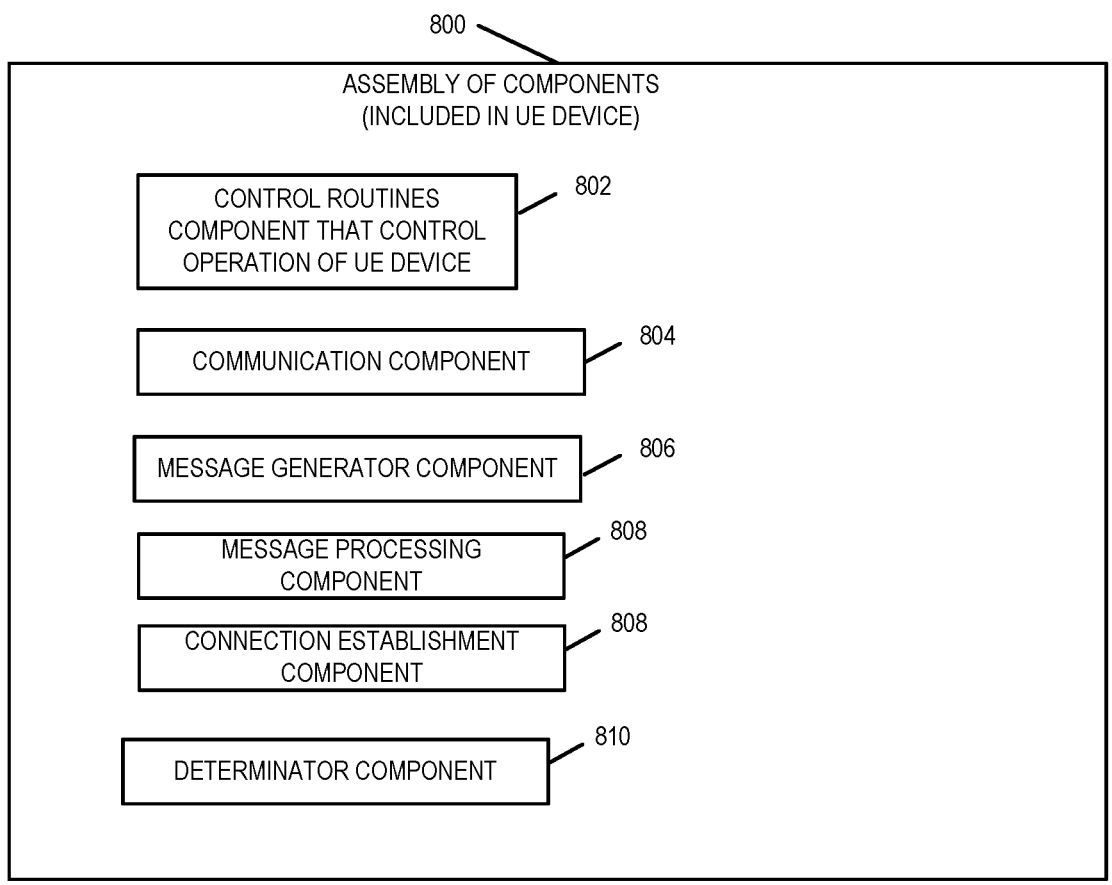
FIG. 8 is a drawing of an exemplary assembly of components which may be, and in some embodiments is, included in an exemplary user device in accordance with an embodiment of the present invention.

FIG. 8 is a drawing of an exemplary assembly of components 800 which may be included in an exemplary user equipment device, e.g., a user equipment device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the mobile terminal 500, with the components controlling operation of mobile terminal 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the mobile terminal 500 or elements therein such as the processor 506, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method.

Assembly of components 800 includes a control routines component 802, a communications component 804, message generator component 806, a message processing component 808, a connection establishment component 810 and a determination component 810.

The control routines component 802 controls the operation of the user equipment device. The communications component 804 performs operations for handling communications with other devices including generation, transmission, receiving, and processing messages, establishing connections, signal processing for different communications protocols. The message generator component 806 generates messages and signals, e.g., messages/signals to be sent to a wireless base station including access request signals/message and response/acknowledgement messages. In some embodiments, the message generator component 806 is a sub-component of communications component 804. The message processing component 808 processes received messages and performs operations in response to received messages.

The connection establishment component 810 handles establishment and termination of communications connections, e.g., device to device communications connections between the user device and wireless base station. In some embodiments, the connection establishment component 810 is a sub-component of communications component 804.

The determination component 812 makes various determinations for the user device including whether the device has any data to transmit to, whether to send an indication to use full IPSec mode of operation or partial IPSec mode of operation to communicate between wireless base stations and the core network.

Figure 9:
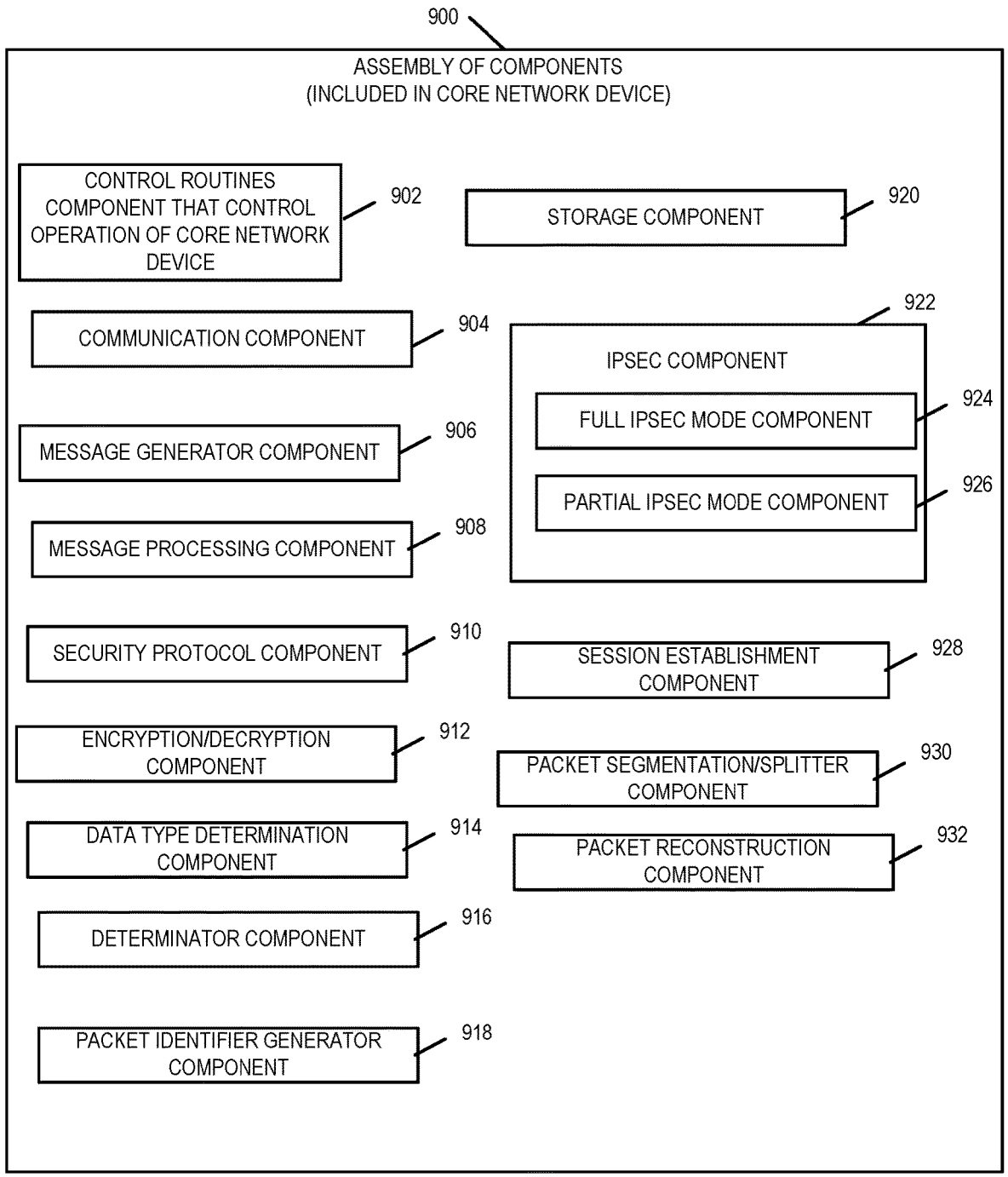
FIG. 9 is a drawing of an exemplary assembly of components which may be, and in some embodiments is, included in an exemplary core network device, e.g., a security function node in accordance with an embodiment of the present invention.

FIG. 9 is a drawing of an exemplary assembly of components 900 which may be included in an exemplary network device, e.g., network device 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the network device 600, with the components controlling operation of network device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function. When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network device 600 or elements therein such as the processor 606, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method.

Assembly of components 900 includes a control routines component 902, a communications component 904, a message generator component 906, a message processing component 908, a security protocol component 910, an encryption/decryption component 912, a data type determination component 914, a determinator component 916, a packet identifier generator component 918, a storage component 920, an IPSec component 922, a session establishment component 928, a packet segmentation/splitter component 930, and a packet reconstruction component 932. In some embodiments, the IPSec component 922 includes a full IPSec mode sub-component 924 and a partial IPSec mode sub-component 926.

The control routines component 902 is configured to control operation of the core network node/device. The communications component 904 is configured to handle communications, e.g., transmission and reception of messages, processing of messages, establishment of communications sessions, and protocol signaling for the wireless base station, IP packet transmission and reception, negotiations of security protocols and parameters to be used for sessions including full IPSec mode of operation and partial IPSec mode of operation. The message generator component 706 is configured to generate messages for transmission to other devices including full IPSec packet messages, partial IPSec packet messages, IP packet messages. The message processing component 708 is configured to process received messages and/or IP packets and is sometimes a sub-component of communications component 704.

The security protocol component 910 is sometimes a sub-component of the communications component. The security protocol component 910 is configured to negotiate and implement different security protocols which are utilized by the core network node/device to secure communications on untrusted or non-secure connection with another device or endpoint, e.g., a base station. One of the security protocols that the security protocol implements is the IPSec ESP security protocol. The encryption/decryption component 912 encrypts messages, packets, data, and information and decrypts encrypted messages, packets, data and information. The encryption/decryption component 912 is sometimes a sub-component of the communication component 904 and/or the security protocol component 910. The data type determination component 914 makes data type determinations on received data for example data received from elements or devices in the core network to be transmitted to a base station over an unsecure communications path. The data type determination component 914 determines whether received data from another device in the core network is delay sensitive or not delay sensitive. The data type determination component 914 determines whether data received from a device in the core network is one of the following types: gaming data, commercial transaction data, call data. The data type determination component 914 determines whether data is a data type to be communicated using full IPSec mode or partial IPSec mode. In some embodiments, the data type determination component is a sub-component of the determinator component 916. The determinator component 916 makes data type determinations, determinations as to whether data is to be transmitted in full IPSec mode or partial IPSec mode, determinations as to whether first portions of IP packets match second portions of IP packets based on an identifier included in or with the first portion of an IP packet and the second portion of an IP packet, determinations as to which portions of an IP packet are to be communicated using IPSec with encryption or another security protocol using encryption and which portion of an IP packet are to be communications using non-IPSec or without encryption, determinations of identifiers to add to portions of IP packets to identify the portions of the IP packets belonging to the same IP packet, determinations as to whether a connection between the core network device and a base station and/or another node/device is untrusted and/or not secured.

The packet identifier generator component 918 generates an identifier that is added to different portions of a packet so that the different portions of the packet can later be determined or identified as corresponding to the same packet.

The storage component 920 controls the storage and retrieval of items including information, data, and messages to memory and buffers included in or coupled to the core network node/device.

The IPSec component 922 is sometimes a sub-component of the communications component 904 and/or the security protocol component 910. In some embodiments, the IPSec component 922 includes a full IPSec mode sub-component 924 and a partial IPSec mode sub-component 926. The IPSec component 922 determines when partial IPSec mode of communication is to be utilized with respect to the communication of IP packets of an IP packet stream and when full IPSec mode of communication is to be utilized with respect to communicating IP packets of an IP packet stream. The IPSec component 722 also negotiates with far end devices the implementation of the IPSec protocol parameters for IPSec sessions when IPSec tunnel mode of communications is to be used for communication in connection with IP packets as well as whether full IPSec mode of communication is to be used or partial IPSec mode of communication is to be used. The IPSec component establishes IPSec sessions and/or IPSec tunnels with far end nodes/devices including other nodes and/or devices including base stations. The full IPSec mode component establishes IPSec tunnels and/or sessions utilized to communicate IP packets securely in encrypted format in IPSec packets to peer network nodes/devices, e.g., base stations. The partial IPSec mode component establishes IPSec tunnels and/or sessions as well as non-IPSec sessions for the communication of IPSec and non-IPSec packets using the partial IPSec mode of communications. The full IPSec mode component 924 implements the steps, functions and procedures to set up and communicate with other devices using IPSec EAS protocol. The partial IPSec mode component 926 implements the steps, functions and procedures to set up and communicate with other devices using IPSec EAS protocol for a first portion of each IP packet of an IP packet stream and non-IPSec session or regular IP packet session for a second portion of each IP packet of an IP packet stream.

The session establishment component 928 is sometimes a sub-component of the communications component. The session establishment component establishes session between the core network device and other devices including negotiations and protocol parameters to be utilized during the session.

The packet segmentation/splitter component 930 segments or splits a packet into different segments or portions. The packet segmentation/splitter component 930 segments and/or splits IP packets into a first portion and a second portion when partial IPSec mode of communications is being utilized in connection with an IP packet stream.

The packet reconstruction component 932 reconstructs and/or reassembles a packet from different packet portions or segments such as those received from other devices at the core network node/device when the core network device is operating in partial IPSec mode of operation with respect to an IP packet stream.

Figure 10A:
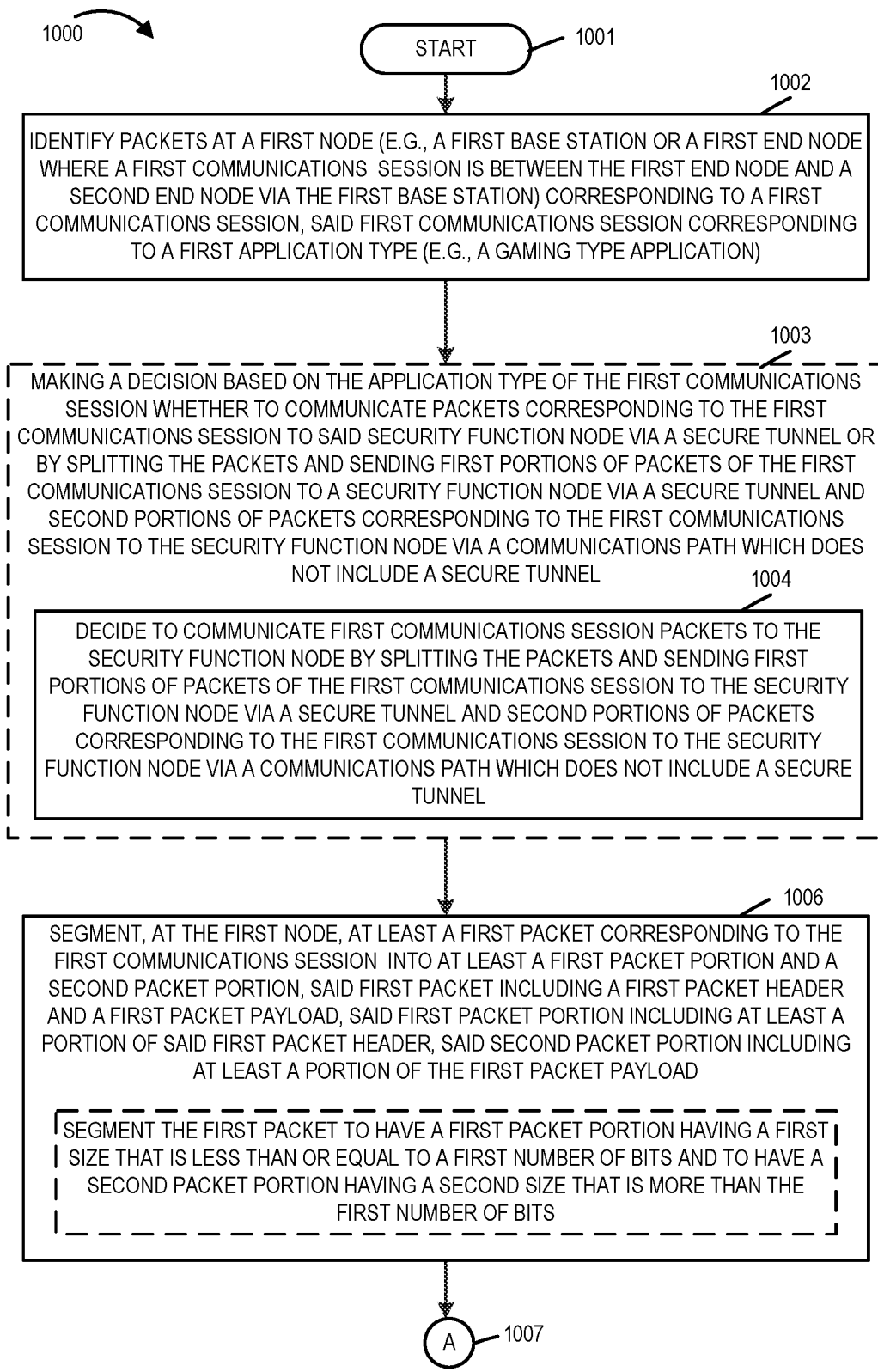
FIG. 10A is a first part of a flowchart of another exemplary communications method in accordance with an exemplary embodiment.
Figure 10B:
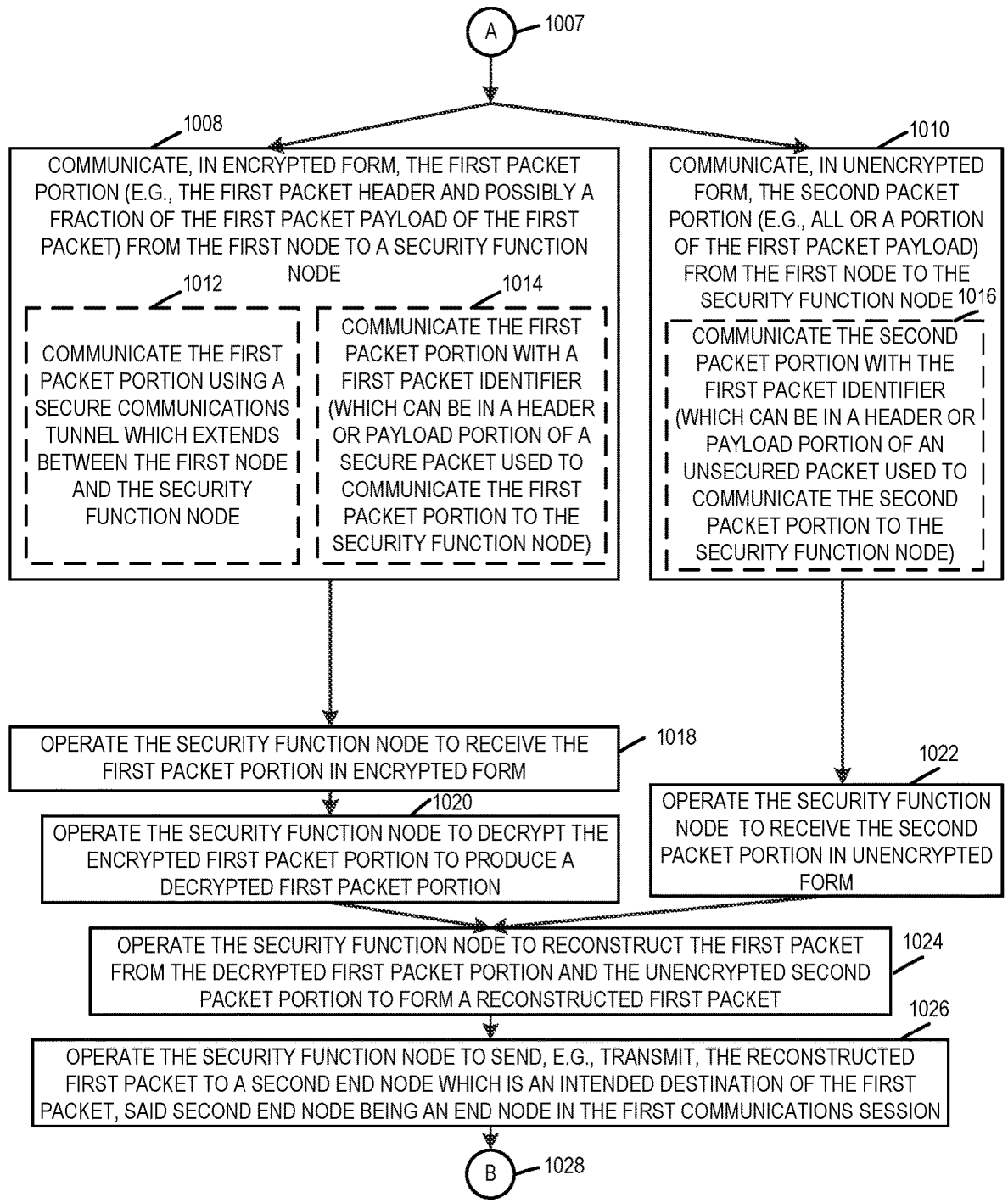
FIG. 10B is a second part of a flowchart of another exemplary communications method in accordance with an exemplary embodiment.
Figures 10, 10C:
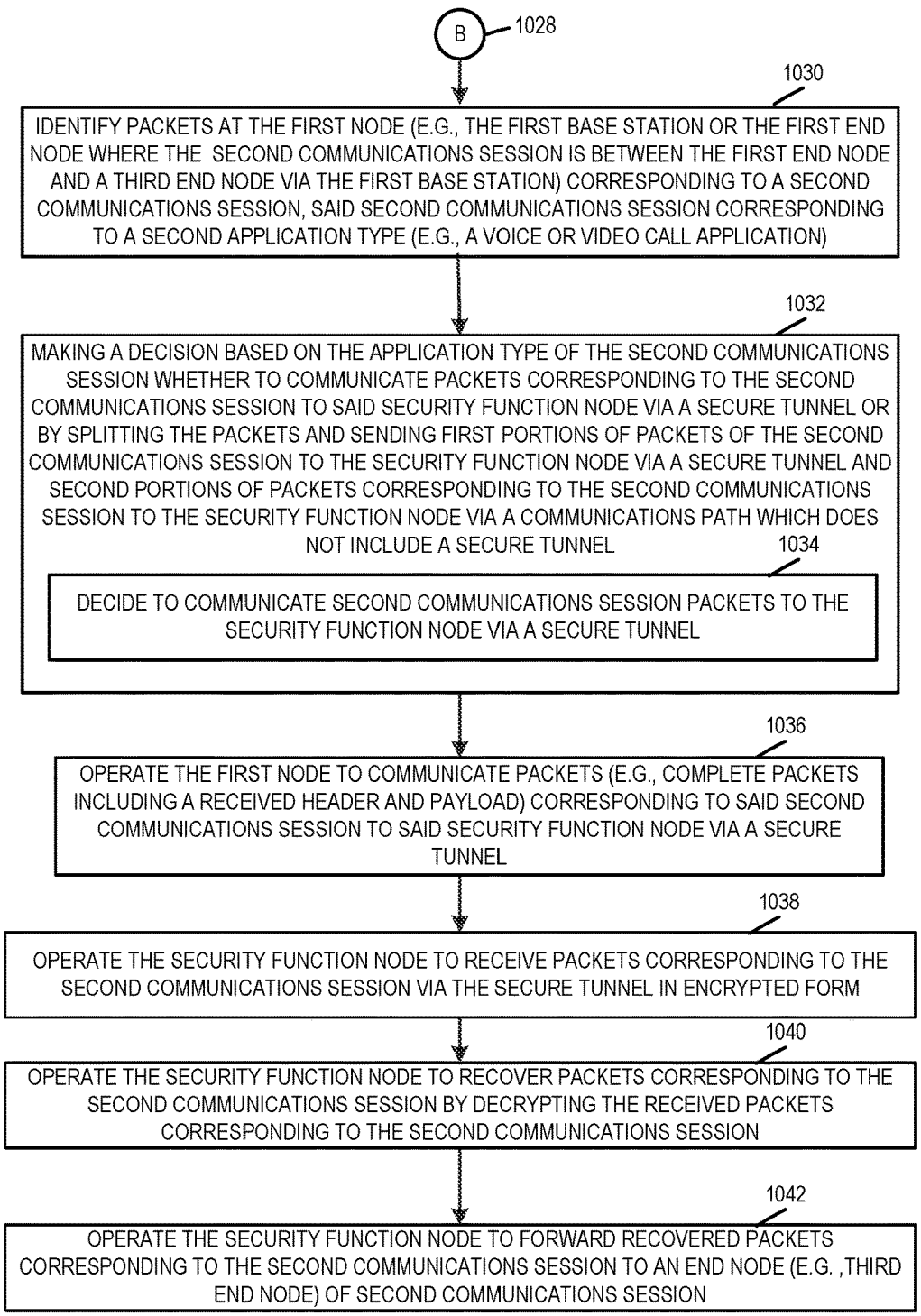
FIG. 10 comprises the combination of FIG. 10A, FIG. 10B, and FIG. 10C.
FIG. 10C is a third part of a flowchart of another exemplary communications method in accordance with an exemplary embodiment.

FIG. 10, which comprises the combination of FIGS. 10A, 10B, and 10C, illustrates an exemplary method 1000 in accordance with one embodiment of the present invention. FIG. 10A illustrates the steps of the first part of the exemplary method 1000 in accordance with one embodiment of the present invention. FIG. 10B illustrates the steps of the second part of the exemplary method 1000 in accordance with one embodiment of the present invention. FIG. 10C illustrates the steps of the third part of the exemplary method 1000 in accordance with one embodiment of the present invention.

For explanatory purposes the exemplary method 1000 will be explained in connection with the exemplary communications system 100 illustrated in FIG. 1 although it should be understood that the method may be implemented using other systems and other system configurations then those illustrated in FIG. 1. While it will be readily understood that additional steps and signaling are performed in connection with communicating information, messages, and packets between devices, the method 1000 focuses on and discusses the steps and signaling for understanding the invention.

Operation of the exemplary method starts in start step 1001 shown on FIG. 10A with operation proceeding to step 1002.

In step 1102, packets are identified at a first node, e.g., base station 1 102, corresponding to first communications. The first communications session corresponding to a first application type such as for example a gaming type application. The first node may be, and in some embodiments is, a first base station located in the communications path between a first end node of the first communications session and a second end node of the first communications session. In some embodiments, the first node is the first end node of the first communications sessions and/or a wireless base station. In system 100 of FIG. 1, the first node is base station 1 102. The first base station may be, a gNB and/or CBSD. Operation proceeds from step 1002 to step 1003.

Step 1003 is an optional step. In embodiments in which step 1003 is not implemented operation proceeds from step 1002 to step 1005. In some embodiments, the first node is programmable and/or configurable so that it can be programmed and/or configured to operate in a first mode of operation or a second mode of operation. In the first mode of operation optional step 1003 is implemented while in the second mode of operation step 1003 is bypassed or skipped.

In step 1003, the first node makes a decision based on the application type of the first communications session as to whether to communicate packets corresponding to the first communications session to a security function node via a secure tunnel or by splitting the packets and sending first portions of packets of the first communications session to a security function node, e.g., core network device 114 with security functionality of system 100, via a secure tunnel and second portions of packets corresponding to the first communications session to the security function node via a communications path which does not include a secure tunnel.

In some embodiments, step 1003 includes sub-step 1004. In sub-step 1004, the first node decides to communicate first communications session packets to the security function node by splitting the packets and sending first portions of packets of the first communications session to the security function node via a secure tunnel and second portions of packets corresponding to the first communications session to the security function node via a communications path which does not include a secure tunnel. Operation proceeds from step 1003 to step 1005.

In step 1005, the first node segments at least a first packet corresponding to the first communications session into at least a first packet portion and a second packet portion. The first packet including a first packet header and a first packet payload. The first packet portion including at least a portion of said first packet header. The second packet portion including at least a portion of the first packet payload. In some embodiments the first packet portion includes only a header portion of the first packet. In some embodiments, the first packet portion includes the header portion of the first packet and a first portion of the payload of the first packet. In some embodiments the second packet portion includes the payload portion of said first packet not included in said first packet portion. The payload portion of the first packet not included in the first packet portion including more bits of the payload portion than were included in the first packet portion.

In some embodiments, step 1005 includes sub-step 1006. In sub-step 1006, the first node segments the first packet to have a first packet portion having a first size that is less than or equal to a first number of bits and to have a second packet portion having a second size that is more than the first number of bits. Operation proceeds from step 1005 via connection node A 1007 to steps 1008 and 1010 shown on FIG. 10B.

In step 1008, the first node communicates, in encrypted form, the first packet portion (e.g., the first packet header and possibly a fraction of the first packet payload of the first packet) from the first node to the security function node. In some embodiments, step 1008 includes one or more sub-steps 1012 and 1014.

In sub-step 1012, the first node communicates the first packet portion using a secure communications tunnel which extends between the first node and the security function node. In some embodiments, the secure communications tunnel is an IPsec communications tunnel. In sub-step 1014, the first node communicates the first packet portion with a first packet identifier (which can be in a header or payload portion of a secure packet used to communicate the first packet portion to the security function node). Operation proceeds from step 1008 to step 1018.

In step 1018, the security function node is operated to receive the first packet portion in encrypted form. Operation proceeds from step 1018 to step 1020.

In step 1020, the security function node is operated to decrypt the encrypted first packet portion to produce a decrypted first packet portion. Operation proceeds from step 1020 to step 1024.

Returning to step 1010, in step 1010, the first node communicates in unencrypted form, the second packet portion (e.g., all or a portion of the first packet payload) from the first node to the security function node. In some embodiments, step 1010 includes sub-step 1016. In sub-step 1016, the first node communicates the second packet portion with the first packet identifier (which can be in a header or payload portion of an unsecured packet used to communicate the second packet portion to the security function node. Operation proceeds from step 1010 to step 1022.

In step 1022, the security function node is operated to receive the second packet portion in unencrypted form. Operation proceeds from step 1022 to step 1024.

In step 1024, the security function node is operated to reconstruct the first packet from the decrypted first packet portion and the unencrypted second packet portion to form a reconstructed first packet. Operation proceeds from step 1024 to step 1026.

In step 1026, the security function node is operated to send, e.g., transmit, the reconstructed first packet to a second end node which is an intended destination of the first packet. The second end node being an end node of the first communications session. Operation proceeds from step 1026 via connection node B 1028 to step 1030 shown on FIG. 10C.

In step 1030, the first node identifies packets corresponding to a second communications session. The second communications session corresponding to a second application type (e.g., a voice or video call application type). The second communications session may be, and in some embodiments is, between the first end node and a third node with the third node being an end node. The first node being a node in the communications path between the first end node and the third node. Operation proceeds from step 1030 to step 1032.

In step 1032, the first node makes a decision based on the application type of the second communications session as whether or not to communicate packets corresponding to the second communications to the security function node via a secure tunnel or by splitting the data packets of the second communications session and sending first portions of packets of the second communications session to the security function node via a secure tunnel and second portions of packets corresponding to the second communications session to the security function node via a communications path which does not include a secure tunnel. In some embodiments step 1032 includes sub-step 1034. In step 1034, the first node decides to communicate second communications session packets to the security function node via a secure tunnel. In some embodiments, step 1032 is optional. When step 1032 is not implemented operation proceeds from step 1030 to step 1036.

In step 1036, the first node is operated to communicate packets (e.g., complete packets including a received packet header and packet payload) corresponding to the second communications session to the security function node via a secure tunnel. The transmitted packets being encrypted by the first node. Operation proceeds from step 1036 to step 1038.

In step 1038, the security function node is operated to receive packets corresponding to the second communications session via the secure tunnel in encrypted form. Operation proceeds from step 1038 to step 1040.

In step 1040, the security function node is operated to recover packets corresponding to the second communications session by decrypting the received packets corresponding to the second communications session. Operation proceeds from step 1040 to step 1042.

In step 1042, the security function node is operated to forward recovered packets corresponding to the second communications session to an end node (e.g., the third end node) of the second communications session.

The method 1000 is repeated for additional communications sessions which are established with communications paths that include the first node.

Various additional optional features of the method 1000 and the system on which the method may be implemented will now be discussed.

In various embodiments, the first node is a first wireless base station. In some such embodiments, the first wireless base station is a gNB wireless base station. In some embodiments, the first node is a first wireless base station that is part of a 5G wireless network. In some such embodiments, the 5G wireless network is a Citizens Broadband Radio Service (CBRS) wireless network and the gNB wireless base station is a Citizens Broadband Radio Service Device (CBSD).

In various embodiments, the first node is a first wireless base station which is a 5G Citizens Broadband Radio Service Device deployed inside a first building by a first customer or at a first fixed wireless access location.

In some embodiments, the security function node is a security gateway device located in a core network. In some such embodiments, the first node and the core network are owned and operated by a first service provider and a first communications path between the first node and the security gateway device is owned by a second service provider different from the first service provider.

In some embodiments the method 1000 further includes the step of determining by the first node that communications between the first node and a core network are not secured. This step is performed after initialization and/or activation of the first node.

In some embodiments, the first node is a wireless base station; the identified packets are backhaul communications data packets received from a first user equipment device to which the wireless base station is providing wireless services, and the first communications session is a backhaul data communications session.

In some embodiments the wireless base station utilizes an IPSec encryption protocol to encrypt the first packet portion, said IPSec encryption protocol having been negotiated with the security function node prior to the wireless base station communicating the first packet portion in encrypted from to the security function node.

Figure 11A:
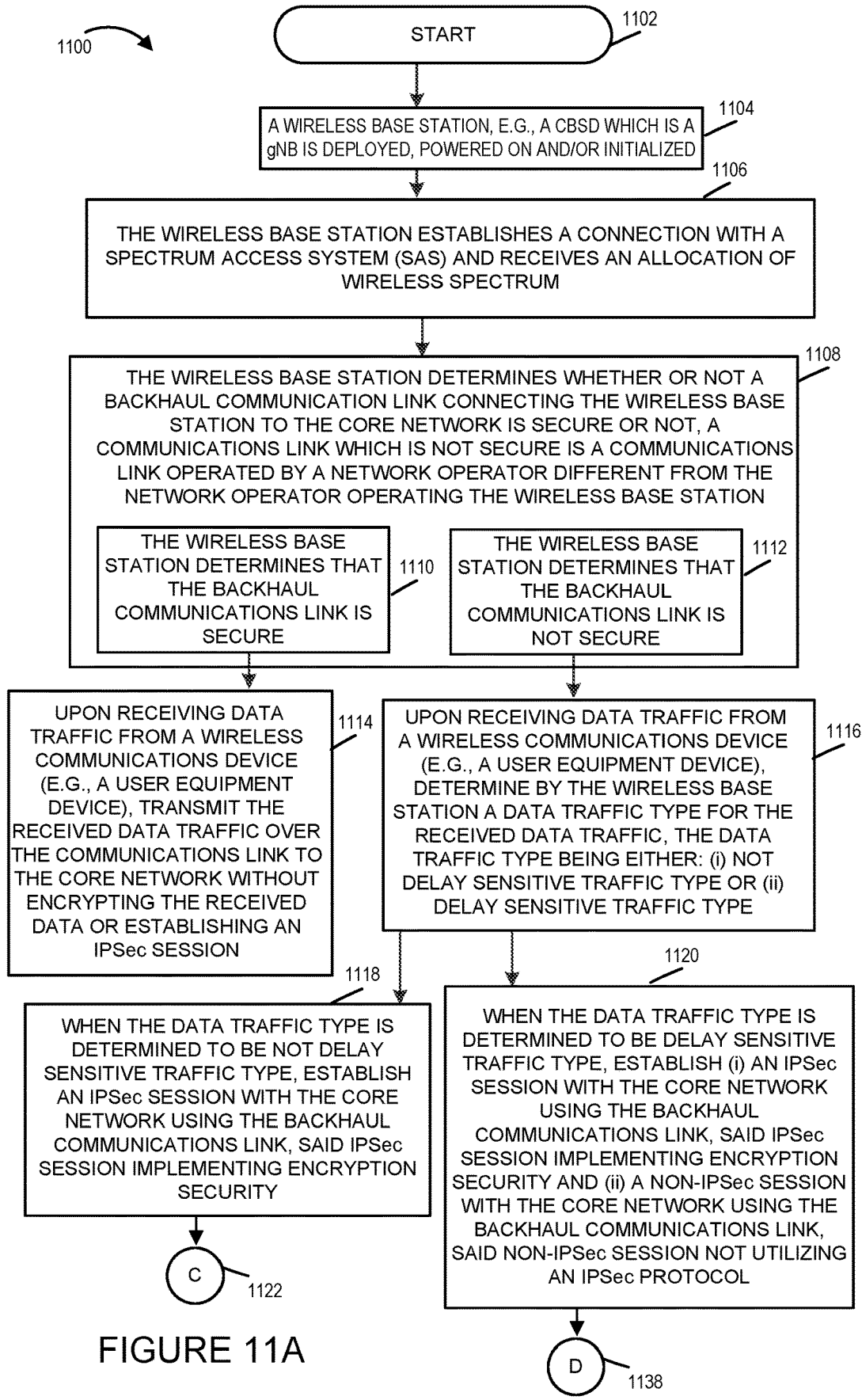
FIG. 11A is a first part of a flowchart of another exemplary communications method in accordance with an exemplary embodiment.
Figures 11, 11A, 11B, 11C, 11D, 11E:
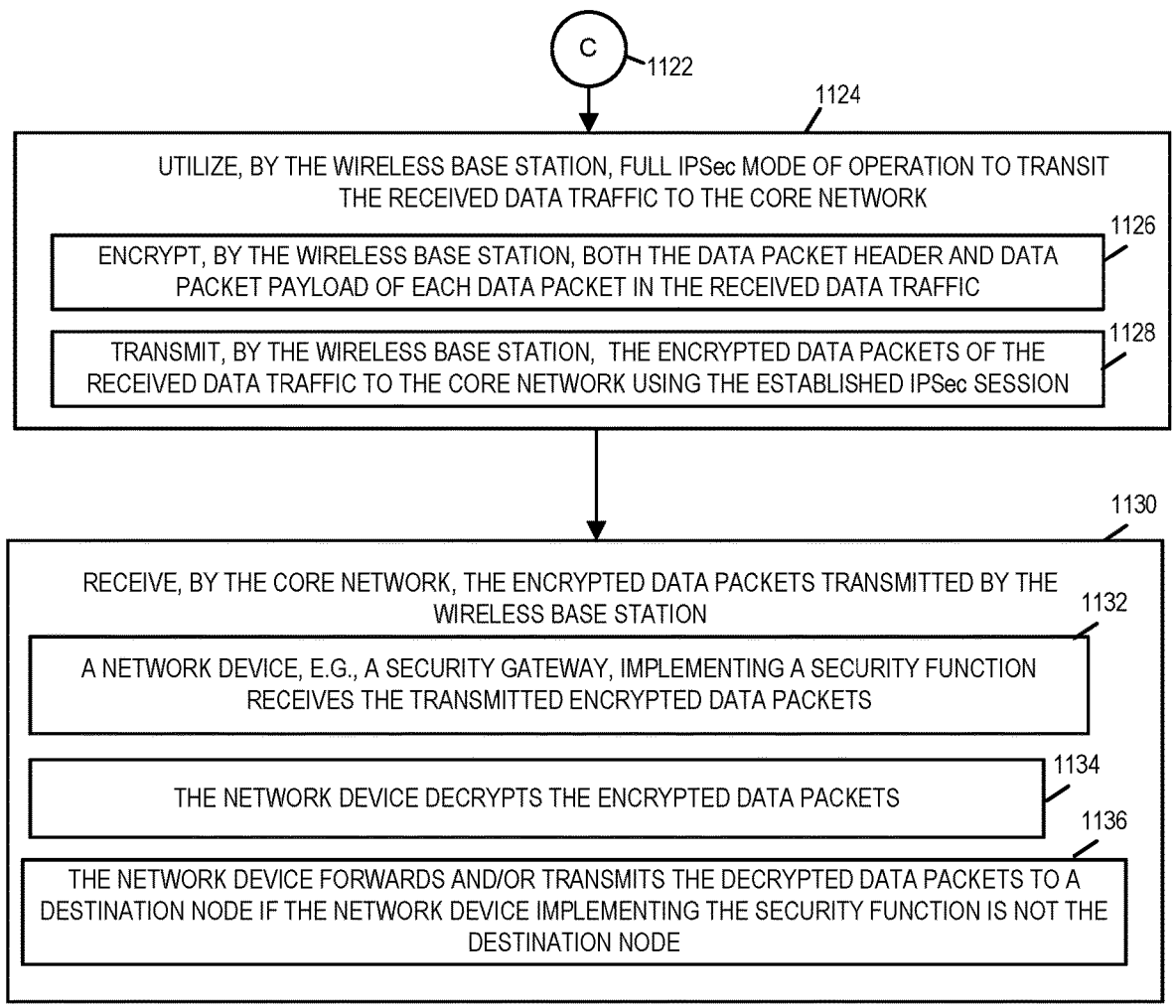
FIG. 11 comprises the combination of FIG. 11A, FIG. 11B, FIG. 11C, FIG. 11D, and FIG. 11E.
FIG. 11B is a second part of a flowchart of another exemplary communications method in accordance with an exemplary embodiment.
FIG. 11C is a third part of a flowchart of another exemplary communications method in accordance with an exemplary embodiment.
FIG. 11D is a fourth part of a flowchart of another exemplary communications method in accordance with an exemplary embodiment.
FIG. 11E is a fifth part of a flowchart of another exemplary communications method in accordance with an exemplary embodiment.
Figure 11C:
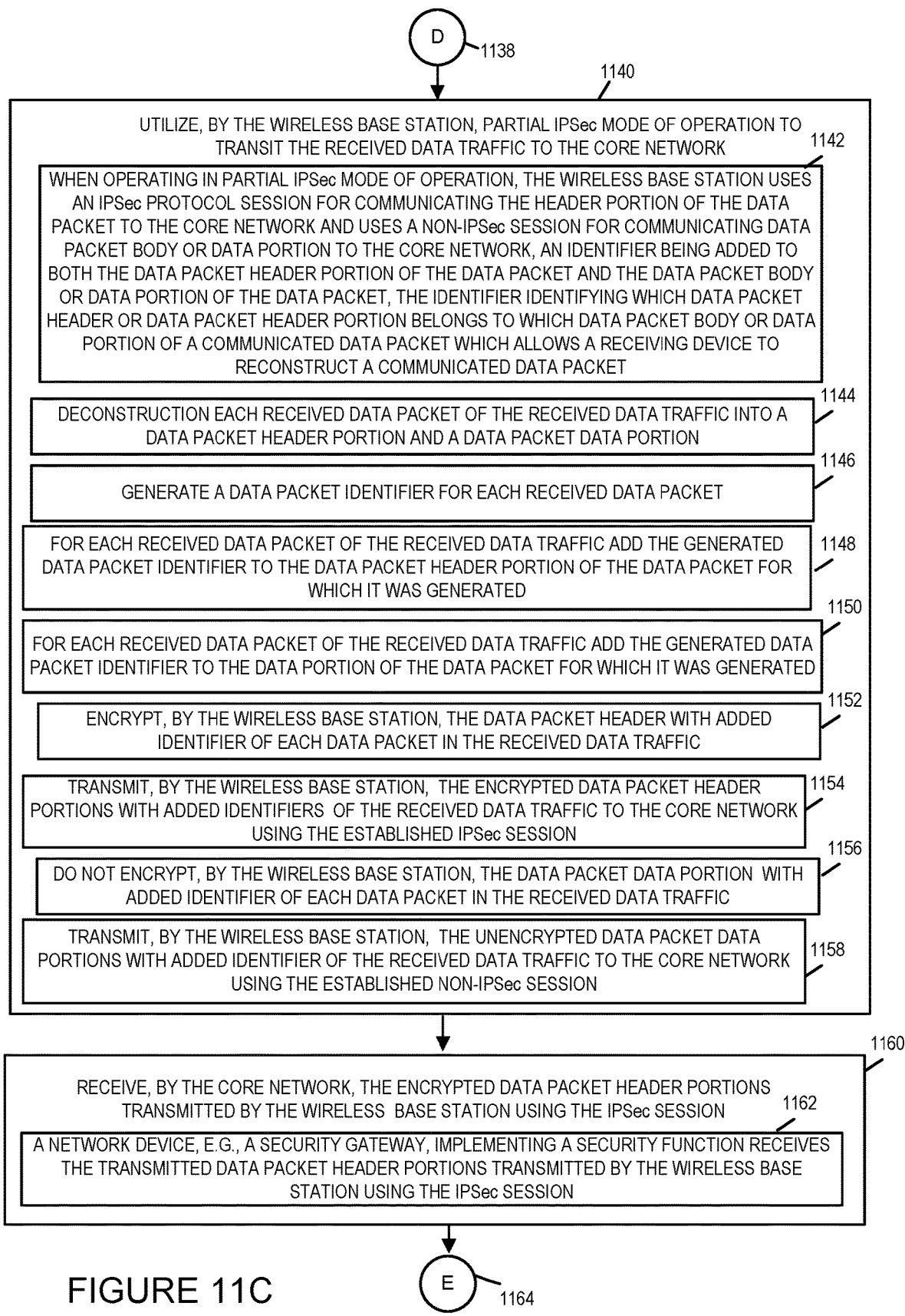
Figure 11D:
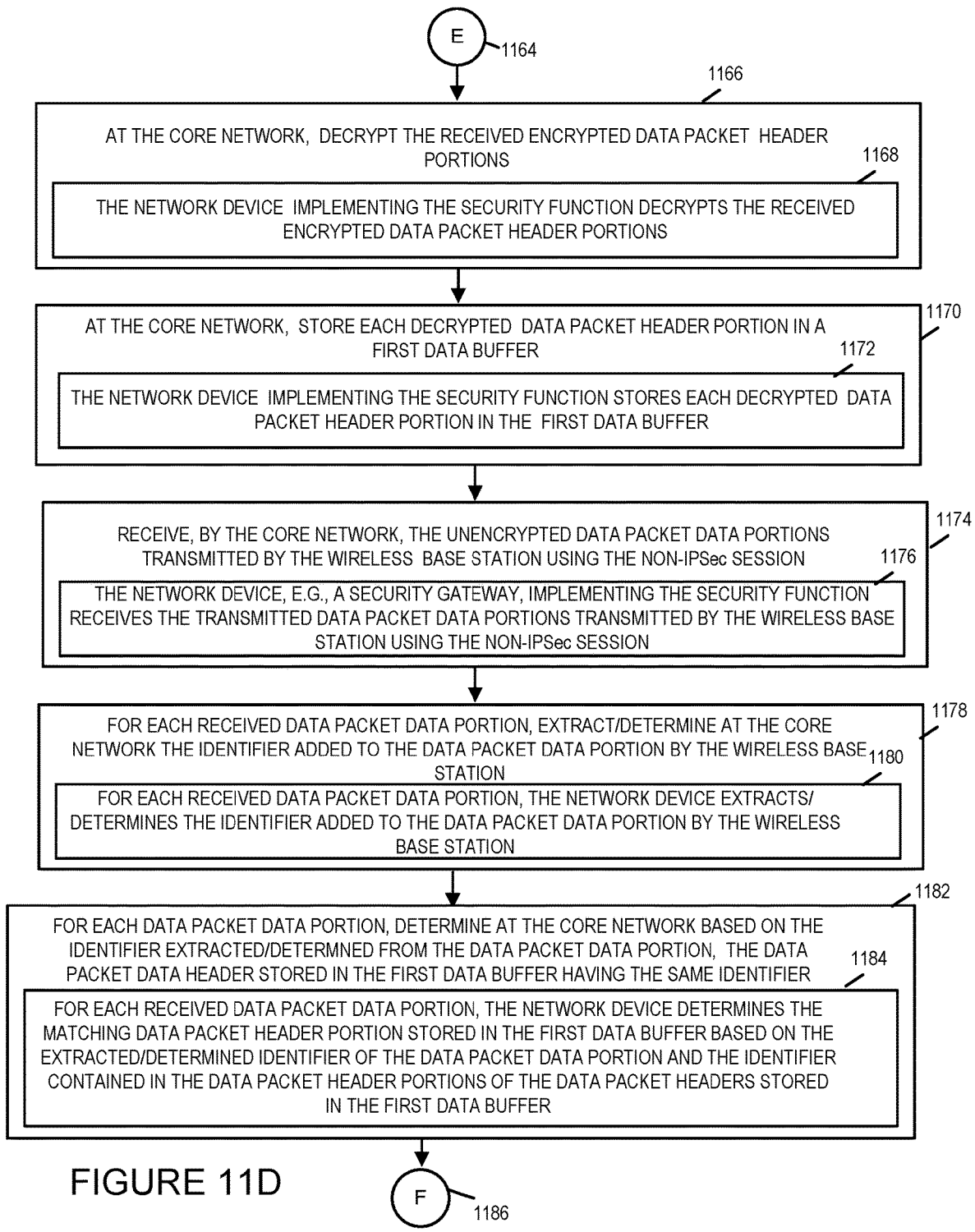
Figure 11E:
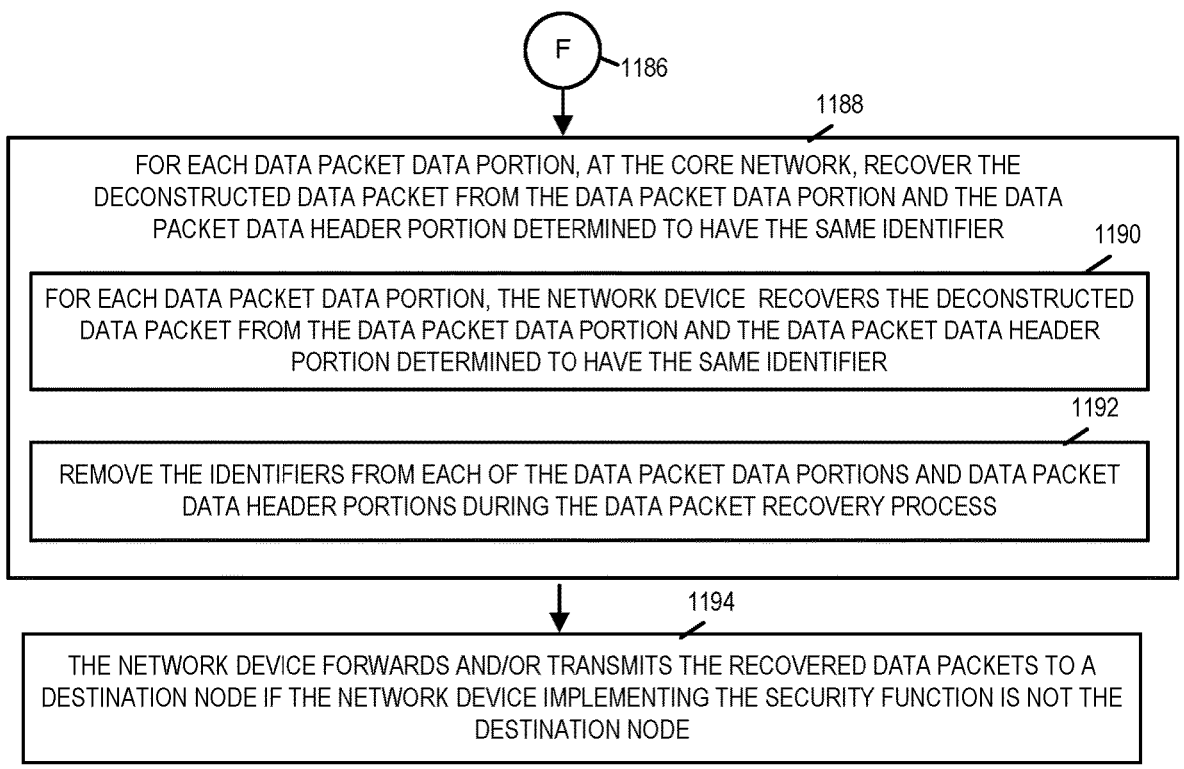

FIG. 11, which comprises the combination of FIGS. 11A, 11B, 11C, 11D and 11E illustrates another exemplary method 1100 in accordance with an embodiment of the present invention. FIG. 11A illustrates the steps of the first part of the exemplary method 1100 in accordance with one embodiment of the present invention. FIG. 11B illustrates the steps of the second part of the exemplary method 1100 in accordance with one embodiment of the present invention. FIG. 11C illustrates the steps of the third part of the exemplary method 1100 in accordance with one embodiment of the present invention. FIG. 11D illustrates the steps of the fourth part of the exemplary method 1100 in accordance with one embodiment of the present invention. FIG. 11E illustrates the steps of the fifth part of the exemplary method 1100 in accordance with one embodiment of the present invention.

For explanatory purposes the exemplary method 1100 will be explained in connection with the exemplary communications system 100 illustrated in FIG. 1 although it should be understood that the method may be implemented using other systems and other system configurations then those illustrated in FIG. 1. While it will be readily understood that additional steps and signaling are performed in connection with communicating information, messages, and packets between devices, the method 1100 focuses on and discusses the steps and signaling for understanding the invention.

Operation of the exemplary method starts in start step 1102 with operation proceeding from step 1102 to step 1104.

In step 1104, a wireless base station, e.g., a gNB wireless base station such as a CBSD gNB wireless base station, is deployed, powered on and/or initialized. In one exemplary embodiment, the wireless base station is base station 1 102 of system 100 of FIG. 1. Operation proceeds from step 1004 to step 1106.

In step 1106, the wireless base station establishes a connection with a spectrum access system (SAS) and receives an allocation of wireless spectrum to use for communicating with other wireless devices, e.g., user equipment devices to which it is providing wireless services such as cell phones, smart phones, laptops, tablets, computers, smart wireless devices and sensors, automobiles, entertainment systems, and customer premises equipment devices providing services to a location or customer premises. In some embodiments, the wireless base station is a CBSD device which registers with the SAS. The CBSD and SAS being part of CBRS network. In some embodiments instead of registering with an SAS device, the wireless base station registers with another resource allocation device that allocates spectrum to the wireless base station. Operation proceeds from step 1106 to step 1108. It should be noted that step 1106 is optional and in some embodiments, the wireless base station does not have to register with an SAS or another resource allocation device to use spectrum. In such cases, step 1106 of the method is not implemented and operation proceeds from step 1104 directly to step 1108.

In step 1108, the wireless base station determines whether or not a backhaul communications link connecting the wireless base station to the core network is secure or not. A communications link which is not secure is a communications link operated by a network operator different from the network operator operating the wireless base station and/or is a link which is accessible to the public. Step 1108 includes sub-steps 1110 and 1112.

In sub-step 1110 of step 1108, the wireless base station determines that the backhaul communications link is secure. Operation proceeds from sub-step 1110 to step 1114.

In step 1114, upon receiving data traffic from a wireless communications device (e.g., a user equipment device), the wireless base station transmits received data traffic over the communications link to the core network without encrypting the received data or establishing an IPSec session.

In sub-step 1112 of step 1108, the wireless base station determines that the backhaul communications link is not secure. Operation proceeds from step 1112 to step 1116.

In step 1116, upon receiving data traffic from a wireless communications device (e.g., a user equipment device), the wireless base station determines a data traffic type for the received data traffic. The data traffic type being either (i) not delay sensitive traffic type or (ii) delay sensitive traffic type. Operation proceeds from step 1116 to steps 1118 and 1120.

In step 1118, when the data traffic type is determined to be not delay sensitive traffic type, the wireless base station establishes an IPSec session with the core network using the backhaul communications link. The IPsec session implementing encryption security. The IPSec session typically is a secure IPSec tunnel implemented in accordance with the IPSec protocols. Operation proceeds from step 1118 via connection node C 1122 to step 1124 shown on FIG. 11B.

In step 1124, the wireless base station utilizes full IPSec mode of operation to transmit the received data traffic to the core network, e.g., a security device such as a security gateway in the core network, over the backhaul communications link. In some embodiments, step 1124 includes one or more sub-steps 1126 and 1128. In sub-step 1126, the wireless base station encrypts both data packet header and data packet payloads of each data packet in the received data traffic. In sub-step 1128, the wireless base station transmits the encrypted data packets of the received data traffic to the security device, e.g., the security gateway device, in the core network using the established IPSec session. Operation proceeds from step 1124 to step 1130. The security device in some embodiments is a security gateway. The security device in some embodiments is a multi-function device wherein one of the multi-functions is a security function such as being able to establish IPSec protocol sessions with other entities such as the wireless base station.

In step 1130, core network, e.g., the security device in the core network, receives the encrypted data packets transmitted by the wireless base station. In some embodiments step 1130 includes one or more sub-steps 1132, 1134 and 1136.

In sub-step 1132, a network device, e.g., a security gateway, implementing a security function receives the transmitted encrypted data packets.

In sub-step 1134, the network device decrypts the encrypted data packets.

In sub-step 1136, the network device forwards and/or transmits the decrypted data packets to a destination node if the network device implementing the security function is not the destination node.

Returning to step 1120, when the data traffic type is determined to be delay sensitive traffic type, the wireless base station establishes: (i) an IPSec session with the core network, e.g., a network device implementing a security function in the core network, using the backhaul communications link and (ii) a non-IPSec session with the core network, e.g., the network device implementing the security function, using the backhaul communications link. The IPSec session implementing encryption security. The non-IPSec session not utilizing an IPSec protocol or encryption. Operation proceeds from step 1120 via connection node D 1138 to step 1140 shown on FIG. 11C.

In step 1140, the wireless base station utilizes partial IPSec mode of operation to transmit the received data traffic to the core network over the backhaul communications link. Step 1140 includes one or more sub-steps 1142, 1144, 1146, 1148, 1150, 1152, 1154, 1156, 1158.

In sub-step 1148, when operating in partial IPSec mode of operation with respect to received data traffic, the wireless base station uses an IPsec protocol session for communicating the header portions of received data packets to the core network and uses a non-IPSec session for communicating data packet bodies or data portions of received data packets to the core network. An identifier being added to both the data packet header portion and the data packet body or data portion of each data packet. The identifier identifying which data packet header portion or data packet header portion belonging to which data packet body or data portion of a communicated data packet which allows a receiving device to reconstruct a communicated data packet.

In sub-step 1144, the wireless base station deconstructs each received data packet of the received data traffic into a data packet header portion and a data packet data portion.

In sub-step 1146, the wireless base station generates a data packet identifier for each received data packet.

In sub-step 1148, for each received data packet of the received data traffic, the wireless base station adds the generated data packet identifier to the data packet header portion of the data packet for which it was generated.

In sub-step 1150, for each received data packet of the received data traffic, the wireless base station adds the generated data packet identifier to the data portion of the data packet for which it was generated.

In sub-step 1152, encrypt, by the wireless base station, the data packet header/data packet header portion with added identifier of each data packet in the received data traffic.

In sub-step 1154, transmit, by the wireless base station, the encrypted data packet headers/data packet header portions with added identifiers of the received data traffic to the core network, e.g., to a network device located in the core, using the established IPSec session.

In sub-step 1156, do not encrypt or refrain from encrypting, by the wireless base station, the data packet data portion/data packet body portion with added identifier of each data packet in the received data traffic.

In sub-step 1158, transmit, by the wireless base station, the unencrypted data packet data portions/data packet data bodies with added identifier of the received data traffic to the core network using the established non-IPSec session.

Operation proceeds from step 1140 to step 1160.

In step 1160, receive, by the core network, the encrypted data packet header portions transmitted by the wireless base station using the IPSec session. In some embodiments step 1160 includes sub-step 1162. In sub-step 1162, a network device, e.g., a security gateway, implementing a security function receives the transmitted data packet headers/data packet header portions transmitted by the wireless base station using the IPSec session. Operation proceeds from step 1160 via connection node E 1164 to step 1166 shown on FIG. 11D.

In step 1166, the received encrypted data packet headers/header portions are decrypted at the core network. In some embodiments, step 1166 includes sub-step 1168. In sub-step 1168, the network device implementing the security function decrypts the received encrypted data packet header portions. Operation proceeds from step 1166 to step 1170.

In step 1170, each decrypted data packet header/header portion is stored in a first data buffer at the core network. In some embodiments, step 1170 includes sub-step 1172. In sub-step 1172, the network device implementing the security function stores each decrypted data packet header/header portion in the first data buffer. Operation proceeds from step 1170 to step 1174.

In step 1174, the unencrypted data packet data bodies/data portions transmitted by the wireless base station using the non-IPSec session is received by and/or at the core network, e.g., by the network device implementing the security function. In some embodiments step 1174 includes sub-step 1176. In sub-step 1176, the network device, e.g., a security gateway, implementing the security function receives the transmitted data packet data bodies/data portions transmitted by the wireless base station using the non-IPSec session. Operation proceeds from step 1174 to step 1178.

In step 1178, for each received data packet data portion/data body, extract and/or determine at the core network the identifier added to the data packet data portion/data body by the wireless base station. In some embodiments step 1178 includes sub-step 1180. In sub-step 1180, for each received data packet data portion/data body, the network device extracts and/or determines the identifier added to the data packet data portion/data body by the wireless base station. Operation proceeds from step 1178 to step 1182.

In step 1182, for each data packet data portion/data packet body, determine at the core network based on the identifier extracted and/or determined from the data packet data portion/data body, the data packet header/data packet header portion stored in the first data buffer having the same identifier. In some embodiments step 1182 includes sub-step 1184. In sub-step 1184, fore each received data packet data portion/data body, the network device determines the matching data packet header/data packet header portion stored in the first data buffer based on the extracted and/or determined identifier of the data packet data portion/data packet body and the identifier contained in the data packet headers/data packet header portions of the data packet headers/data packet header portions stored in the first data buffer. Operation proceeds from step 1182 via connection node 1186 to step 1188 shown on FIG. 11E.

In step 1188, at the core network for each data packet data portion/data packet body recover the deconstructed data packet from the data packet data portion/data packet data body and the data packet data header/data packet data header portion determined to have the same identifier. In some embodiments step 1186 includes one or more sub-steps 1190 and 1192. In sub-step 1190, for each data packet data portion/data packet body, the network device recovers the deconstructed data packet from the data packet data portion/data packet body and the data packet header/data packet data header portion determined to have the same identifier. Operation proceeds from step 1188 to step 1194.

In step 1194, the network devices forwards and/or transmits the recovered data packets to a destination node if the network device implementing the security function is not the destination node.

Various exemplary numbered embodiments illustrating different features of the present invention will now be discussed.

List of Exemplary Numbered Method Embodiments

Method Embodiment 1. A communications method, the method comprising: identifying (1002) packets at a first node (e.g., a first base station or a first end node, where a first communications session is between the first end node and a second end node via the first base station) corresponding to a first communications session, said first communications session corresponding to a first application type (e.g., a gaming type application); segmenting (1006), at the first node, at least a first packet corresponding to the first communications session into at least a first packet portion and a second packet portion, said first packet including a first packet header and a first packet payload, said first packet portion including at least a portion (which may be and sometimes is the full first packet header) of said first packet header, said second packet portion including at least a portion of said first packet payload; communicating (1008), in encrypted form, the first packet portion (e.g., the first packet header portion of the first packet and possibly a fraction of the first packet payload of the first packet) from the first node to a security function node; and communicating (1010), in unencrypted form, the second packet portion (e.g., all or a portion of the first packet payload) from the first node to the security function node.

Method Embodiment 1A. The communications method of Method Embodiment 1 wherein segmenting (1006), at the first node, at least a first packet corresponding to the first communications session into at least a first packet portion and a second packet portion includes segmenting the first packet to have a first packet portion having a first size that is less than or equal to a first number of bits and to have a second packet portion having a second size that is more than said first number of bits.

Method Embodiment 1B. The communications method of Method Embodiment 1A wherein the first packet portion includes only a header portion of said first packet.

Method Embodiment 1C. The communications method of Method Embodiment 1A wherein the first packet portion includes the header portion of said first packet and a first portion of the payload of said first packet.

Method Embodiment 1D. The communications method of Method Embodiment 1C, wherein the second packet portion includes the payload portion of said first packet not included in said first packet portion, said payload portion of said first packet not included in said first packet portion including more bits of said payload portion than were included in said first packet portion.

Method Embodiment 2. The communications method of Method Embodiment 1, wherein communicating (1008), in encrypted form, the first packet portion includes communicating (1012) the first packet portion using a secure communications tunnel which extends between the first node and the security function node.

Method Embodiment 3. The communications method of Method Embodiment 2, wherein communicating (1008), in encrypted form, the first packet portion includes communicating (1014) the first packet portion with a first packet identifier (which can be in a header or payload portion of a secure packet used to communicate the first packet portion to the security function node).

Method Embodiment 5. The communications method of Method Embodiment 3, wherein communicating (1010), in unencrypted form, the second packet portion includes communicating (1016) the second packet portion with the first packet identifier (which can be in a header or payload portion of an unsecured packet used to communicate the second packet portion to the security function node).

Method Embodiment 6. The communications method of Method Embodiment 5, further comprising: operating (1018) the security function node to receive the first packet portion in encrypted form; operating (1022) the security function node to receive the second packet portion in unencrypted form; operating (1020) the security function node to decrypt the encrypted first packet portion to produce a decrypted first packet portion; operating (1024) the security function node to reconstruct the first packet from the decrypted first packet portion and unencrypted second packet portion to form a reconstructed first packet; and operating (1026) the security function node to send (e.g., transmit) the reconstructed first packet to a second end node which is an intended destination of the first packet, said second end node being an end node in the first communications session.

Method Embodiment 7. The communications method of Method Embodiment 6, further comprising: identifying (1030) packets at the first node (e.g., the first base station or the first end node, where a second communications session is between the first end node and a third end node via the first base station) corresponding to a second communications session, said second communications session corresponding to a second application type (e.g., a voice or video call application); making (1032) a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communication path which does not include a secure tunnel.

Method Embodiment 8. The communications method of Method Embodiment 7, wherein making (1032) said decision includes deciding (1034) to communicate second communications session packets to the security function node via a secure tunnel; and wherein the method further comprises: operating (1036) the first node to communicate packets (e.g., complete packets including a received header and payload) corresponding to said second communications session to said security function node via a secure tunnel.

Method Embodiment 8A. The communications method of Method Embodiment 8, wherein the secure tunnel is an IPSec secure tunnel.

Method Embodiment 9. The communications method of Method Embodiment 8, further comprising: operating (1038) the security function node to receive packets corresponding to the second communications session via said secure tunnel in encrypted form; operating (1040) the security function node to recover packets corresponding to the second communications session by decrypting the received packets corresponding to the second communications session; and operating (1042) the security function node to forward recovered packets corresponding to the second communication session to an end node (e.g., third end node) of said second communications session (e.g., without combining the packets with data from another link such as in the case where packets are recovered by combining packet portions from a secure and unsecure link as in the case of communications sessions corresponding to applications of the first type).

Method Embodiment 10. The communications method of Method Embodiment 9, further comprising: making (1003) a decision based on the application type of the first communications session whether to communicate packets corresponding to the first communications session to said security function node via a secure tunnel or by splitting the packets and sending first portions of packets of the first communications session to the security function node via a secure tunnel and second portions of packets corresponding to the first communications session to the security function node via a communication path which does not include a secure tunnel.

Method Embodiment 11. The communications method of Method Embodiment 10, wherein said making (1003) said decision, based on the application type of the first communications session, includes deciding (1004) to communicate first communications session packets to the security function node by splitting the packets and sending first portions of packets of the first communications session to the security function node via a secure tunnel and second portions of packets corresponding to the first communications session to the security function node via a communication path which does not include a secure tunnel.

Method Embodiment 11A. The communications method of Method Embodiment 1, wherein the first node is a first wireless base station.

Method Embodiment 11A1. The communications method of Method Embodiment 11A, wherein the first wireless base station is gNB wireless base station.

Method Embodiment 11A2. The communications method of Method Embodiment 11A1, wherein the first wireless base station is part of a 5G wireless network.

Method Embodiment 11A3. The communications method of Method Embodiment 11A2, wherein the 5G wireless network is Citizens Broadband Radio Service (CBRS) wireless network; and wherein the gNB wireless base station is a Citizens Broadband Radio Service Device (CBSD).

Method Embodiment 12. The communications method of Method Embodiment 1, wherein the first node is a first wireless base station is a 5G Citizens Broadband Radio Service Device deployed inside a first building by a first customer or at a first fixed wireless access location.

Method Embodiment 13. The communications method of Method Embodiment 12, wherein the security function node is a security gateway device located in a core network, said first node and said core network being owned and operated by a first service provider; and wherein a first communications path between the first node and the security gateway device is owned by a second service provider different from the first service provider.

Method Embodiment 14. The communications method of Method Embodiment 1, further comprising: determining by the first node that communications between the first node and a core network are not secured.

Method Embodiment 15. The communications method of Method Embodiment 1, wherein the first node is a wireless base station; wherein the identified packets are backhaul communications data packets received from a first user equipment device to which the wireless base station is providing wireless services; and wherein the first communications session is a backhaul data communications session.

Method Embodiment 16. The communication method of Method Embodiment 15, wherein the wireless base station utilizes an IPSec encryption protocol to encrypt the first packet portion, said IPSec encryption protocol having been negotiated with the security function node prior to the wireless base station communicating the first packet portion in encrypted from to the security function node.

List of Exemplary Numbered System Embodiments

System Embodiment 1. A communications system comprising: a first node, said first node including: a memory; and a first processor, said first processor controlling the first node to perform the following operations: identifying (1002) packets at a first node (e.g., a first base station or a first end node, where a first communications session is between the first end node and a second end node via the first base station) corresponding to a first communications session, said first communications session corresponding to a first application type (e.g., a gaming type application); segmenting (1006), at the first node, at least a first packet corresponding to the first communications session into at least a first packet portion and a second packet portion, said first packet including a first packet header and a first packet payload, said first packet portion including at least a portion (which may be and sometimes is the full first packet header) of said first packet header, said second packet portion including at least a portion of said first packet payload; communicating (1008), in encrypted form, the first packet portion (e.g., the first packet header portion of the first packet and possibly a fraction of the first packet payload of the first packet) from the first node to a security function node; and communicating (1010), in unencrypted form, the second packet portion (e.g., all or a portion of the first packet payload) from the first node to the security function node.

System Embodiment 1A. The communications system of System Embodiment 1 wherein segmenting (1006), at the first node, at least a first packet corresponding to the first communications session into at least a first packet portion and a second packet portion includes segmenting the first packet to have a first packet portion having a first size that is less than or equal to a first number of bits and to have a second packet portion having a second size that is more than said first number of bits.

System Embodiment 1B. The communications system of System Embodiment 1A wherein the first packet portion includes only a header portion of said first packet.

System Embodiment 1C. The communications system of System Embodiment 1A wherein the first packet portion includes the header portion of said first packet and a first portion of the payload of said first packet.

System Embodiment 1D. The communications system of System Embodiment 1C, wherein the second packet portion includes the payload portion of said first packet not included in said first packet portion, said payload portion of said first packet not included in said first packet portion including more bits of said payload portion than were included in said first packet portion.

System Embodiment 2. The communications system of System Embodiment 1, wherein communicating (1008), in encrypted form, the first packet portion includes communicating (1012) the first packet portion using a secure communications tunnel which extends between the first node and the security function node.

System Embodiment 3. The communications system of System Embodiment 2, wherein communicating (1008), in encrypted form, the first packet portion includes communicating (1014) the first packet portion with a first packet identifier (which can be in a header or payload portion of a secure packet used to communicate the first packet portion to the security function node).

System Embodiment 5. The communications system of System Embodiment 3, wherein communicating (1010), in unencrypted form, the second packet portion includes communicating (1016) the second packet portion with the first packet identifier (which can be in a header or payload portion of an unsecured packet used to communicate the second packet portion to the security function node).

System Embodiment 6. The communications system of System Embodiment 5, wherein the security function node includes a second processor, the second processor controlling the security function node to perform the following operations: receive the first packet portion in encrypted form (1018); receive the second packet portion in unencrypted form (1022); decrypt the encrypted first packet portion to produce a decrypted first packet portion (1020); reconstruct the first packet from the decrypted first packet portion and unencrypted second packet portion to form a reconstructed first packet (1024); and send (e.g., transmit) the reconstructed first packet to a second end node which is an intended destination of the first packet, said second end node being an end node in the first communications session 1026).

System Embodiment 7. The communications system of System Embodiment 6, wherein the first processor further controls the first node to perform the following additional operations: identifying (1030) packets at the first node (e.g., the first base station or the first end node, where a second communications session is between the first end node and a third end node via the first base station) corresponding to a second communications session, said second communications session corresponding to a second application type (e.g., a voice or video call application); making (1032) a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communication path which does not include a secure tunnel.

System Embodiment 8. The communications system of System Embodiment 7, wherein making (1032) said decision includes deciding (1034) to communicate second communications session packets to the security function node via a secure tunnel; and wherein the first processor further controls the first node to perform the following additional operations: communicating (1036) packets (e.g., complete packets including a received header and payload) corresponding to said second communications session to said security function node via a secure tunnel.

System Embodiment 8A. The communications system of System Embodiment 8, wherein the secure tunnel is an IPSec secure tunnel.

System Embodiment 9. The communications system of System Embodiment 8, wherein the second processor further controls the security function node to perform the following additional operations: receive packets corresponding to the second communications session via said secure tunnel in encrypted form (1038); recover packets corresponding to the second communications session by decrypting the received packets corresponding to the second communications session (1040); and forward recovered packets corresponding to the second communication session to an end node (e.g., third end node) of said second communications session (e.g., without combining the packets with data from another link such as in the case where packets are recovered by combining packet portions from a secure and unsecure link as in the case of communications sessions corresponding to applications of the first type) (1042).

System Embodiment 10. The communications system of System Embodiment 9, wherein the first processes further controls the first node to perform the following additional operations: making (1003) a decision based on the application type of the first communications session whether to communicate packets corresponding to the first communications session to said security function node via a secure tunnel or by splitting the packets and sending first portions of packets of the first communications session to the security function node via a secure tunnel and second portions of packets corresponding to the first communications session to the security function node via a communication path which does not include a secure tunnel.

System Embodiment 11. The communications method of System Embodiment 10, wherein said making (1003) said decision, based on the application type of the first communications session, includes deciding (1004) to communicate first communications session packets to the security function node by splitting the packets and sending first portions of packets of the first communications session to the security function node via a secure tunnel and second portions of packets corresponding to the first communications session to the security function node via a communication path which does not include a secure tunnel.

System Embodiment 11A. The communications system of System Embodiment 1, wherein the first node is a first wireless base station.

System Embodiment 11A1. The communications system of System Embodiment 11A, wherein the first wireless base station is gNB wireless base station.

System Embodiment 11A2. The communications system of System Embodiment 11A1, wherein the first wireless base station is part of a 5G wireless network.

System Embodiment 11A3. The communications system of System Embodiment 11A2, wherein the 5G wireless network is Citizens Broadband Radio Service (CBRS) wireless network; and wherein the gNB wireless base station is a Citizens Broadband Radio Service Device (CBSD).

System Embodiment 12. The communications system of System Embodiment 1, wherein the first node is a first wireless base station is a 5G Citizens Broadband Radio Service Device deployed inside a first building by a first customer or at a first fixed wireless access location.

System Embodiment 13. The communications system of System Embodiment 12, wherein the security function node is a security gateway device located in a core network, said first node and said core network being owned and operated by a first service provider; and wherein a first communications path between the first node and the security gateway device is owned by a second service provider different from the first service provider.

System Embodiment 14. The communications system of System Embodiment 1, wherein the first processor further controls the first node to perform the following additional operation: determine that communications between the first node and a core network are not secured.

System Embodiment 15. The communications system of System Embodiment 1, wherein the first node is a wireless base station; wherein the identified packets are backhaul communications data packets received from a first user equipment device to which the wireless base station is providing wireless services; and wherein the first communications session is a backhaul data communications session.

System Embodiment 16. The communication method of System Embodiment 15, wherein the wireless base station utilizes an IPSec encryption protocol to encrypt the first packet portion, said IPSec encryption protocol having been negotiated with the security function node prior to the wireless base station communicating the first packet portion in encrypted from to the security function node.

List of Exemplary Numbered Non-transitory Computer Readable Medium Embodiments

Non-transitory Computer Readable Medium Embodiment 1. A non-transitory computer readable medium including a first set of computer executable instructions which when executed by a processor of a first node cause the first node to perform the steps of: identifying (1002) packets at the first node (e.g., a first base station or a first end node, where a first communications session is between the first end node and a second end node via the first base station) corresponding to a first communications session, said first communications session corresponding to a first application type (e.g., a gaming type application); segmenting (1006), at the first node, at least a first packet corresponding to the first communications session into at least a first packet portion and a second packet portion, said first packet including a first packet header and a first packet payload, said first packet portion including at least a portion (which may be and sometimes is the full first packet header) of said first packet header, said second packet portion including at least a portion of said first packet payload; communicating (1008), in encrypted form, the first packet portion (e.g., the first packet header portion of the first packet and possibly a fraction of the first packet payload of the first packet) from the first node to a security function node; and communicating (1010), in unencrypted form, the second packet portion (e.g., all or a portion of the first packet payload) from the first node to the security function node.

The techniques of various embodiments may be implemented using software, hardware and/or a combination of software and hardware. Various embodiments are directed to apparatus, e.g., wireless base stations, gNB base stations, wireless devices, mobile terminals, sensors, vehicles, user equipment, CBSDs, CBRS tower base stations, CBRS CPE devices, user devices, subscriber devices, servers, nodes, core network equipment devices, security gateway devices, and/or elements. Various embodiments are also directed to methods, e.g., method of controlling and/or operating wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements are configured to perform the steps of the methods described as being performed by the wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, and/or elements, with a processor which includes a component corresponding to each of the steps of the various described methods performed by the device in which the processor is included. In some but not all embodiments a device, e.g., wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, gNB base stations, wireless devices, mobile terminals, sensors, vehicles, user equipment, CBSDs, CBRS tower base stations, CBRS CPE devices, SAS devices, user devices, subscriber devices, servers, nodes, core network equipment devices, security gateway devices, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   identifying packets at a first node corresponding to a first communications session, said first communications session corresponding to a first application type;
   segmenting, at the first node, at least a first packet corresponding to the first communications session into at least a first packet portion and a second packet portion, said first packet including a first packet header and a first packet payload, said first packet portion including at least a portion of said first packet header, said second packet portion including at least a portion of said first packet payload;
   communicating, in encrypted form, the first packet portion from the first node to a security function node;
   communicating, in unencrypted form, the second packet portion from the first node to the security function node;
   wherein said communicating, in encrypted form, the first packet portion includes communicating the first packet portion with a first packet identifier;
   wherein said communicating, in unencrypted form, the second packet portion includes communicating the second packet portion with the first packet identifier; and
   wherein the first packet portion includes the header portion of said first packet and a first portion of the payload of said first packet.

2. The communications method of claim 1, wherein communicating, in encrypted form, the first packet portion includes communicating the first packet portion using a secure communications tunnel which extends between the first node and the security function node.

3. The communications method of claim 2, further comprising:
   operating the security function node to receive the first packet portion in encrypted form;
   operating the security function node to receive the second packet portion in unencrypted form;
   operating the security function node to decrypt the encrypted first packet portion to produce a decrypted first packet portion;
   operating the security function node to reconstruct the first packet from the decrypted first packet portion and unencrypted second packet portion to form a reconstructed first packet; and
   operating the security function node to send the reconstructed first packet to a second node which is an intended destination of the first packet, said second node being an end node in the first communications session.

4. The communications method of claim 3, further comprising:
   identifying packets at the first node corresponding to a second communications session, said second communications session corresponding to a second application type;
   making a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communications path which does not include a secure tunnel.

5. The communications method of claim 4,
   wherein making said decision includes deciding to communicate second communications session packets to the security function node via a secure tunnel; and
   wherein the method further comprises:
   operating the first node to communicate packets corresponding to said second communications session to said security function node via a secure tunnel.

6. The communications method of claim 5,
   wherein the first node is a wireless base station; and
   wherein the secure tunnel is an IPSec secure tunnel.

7. The communications method of claim 5, further comprising:
   operating the security function node to receive packets corresponding to the second communications session via said secure tunnel in encrypted form;
   operating the security function node to recover packets corresponding to the second communications session by decrypting the received packets corresponding to the second communications session; and
   operating the security function node to forward recovered packets corresponding to the second communications session to an end node of said second communications session.

8. The communications method of claim 7, further comprising:
   making a decision based on the application type of the first communications session whether to communicate packets corresponding to the first communications session to said security function node via a secure tunnel or by splitting the packets and sending first portions of packets of the first communications session to the security function node via a secure tunnel and second portions of packets corresponding to the first communications session to the security function node via a communications path which does not include a secure tunnel.

9. The communications method of claim 1,
   wherein the second packet portion includes the portion of said first packet payload not included in said first packet portion, said portion of said first packet payload not included in said first packet portion including more bits of said payload of the first packet than were included in said first packet portion.

10. The communications method of claim 9, wherein said first portion of the payload included in the first packet portion is a first amount of the first packet payload, said first amount being smaller in size than a second amount which would cause a delay greater than a first threshold value.

11. The communications method of claim 1, wherein said first portion of the payload of the first packet included in the first packet portion is a first amount of the first packet payload, said first packet payload including user data, said first amount being small enough that a delay introduced by the addition of the first amount of user data to the first packet portion is below a service provider threshold.

12. A communications system comprising:
a first node, said first node including:
a memory; and
a first processor, said first processor controlling the first node to perform the following operations:
identifying packets at a first node corresponding to a first communications session, said first communications session corresponding to a first application type;
segmenting, at the first node, at least a first packet corresponding to the first communications session into at least a first packet portion and a second packet portion, said first packet including a first packet header and a first packet payload, said first packet portion including at least a portion of said first packet header, said second packet portion including at least a portion of said first packet payload;
communicating, in encrypted form, the first packet portion from the first node to a security function node;
communicating, in unencrypted form, the second packet portion from the first node to the security function node;
wherein said communicating, in encrypted form, the first packet portion includes communicating the first packet portion with a first packet identifier;
wherein communicating, in unencrypted form, the second packet portion includes communicating the second packet portion with the first packet identifier; and
wherein the first packet portion includes the header portion of said first packet and a first portion of the payload of said first packet.

13. The communications system of claim 12, wherein communicating, in encrypted form, the first packet portion includes communicating the first packet portion using a secure communications tunnel which extends between the first node and the security function node.

14. The communications system of claim 13,
wherein the security function node includes a second processor, the second processor controlling the security function node to perform the following operations:
receive the first packet portion in encrypted form;
receive the second packet portion in unencrypted form;
decrypt the encrypted first packet portion to produce a decrypted first packet portion;
extract the first packet identifier from the decrypted first packet portion;
extract the first packet identifier from the unencrypted second packet portion;
utilize the extracted first packet identifier from the decrypted first packet portion and the extracted first packet identifier from the unencrypted second packet portion to determine that the first packet portion and the second packet portion belong to the first packet;
reconstruct the first packet from the decrypted first packet portion and unencrypted second packet portion to form a reconstructed first packet; and
send the reconstructed first packet to a second node which is an intended destination of the first packet, said second node being an end node in the first communications session.

15. The communications system of claim 14, wherein the first processor further controls the first node to perform the following additional operations:
identifying packets at the first node corresponding to a second communications session, said second communications session corresponding to a second application type;
making a decision based on the application type of the second communications session whether to communicate packets corresponding to the second communications session to said security function node via a secure tunnel or by splitting the packets and sending first portions of packets of the second communications session to the security function node via a secure tunnel and second portions of packets corresponding to the second communications session to the security function node via a communications path which does not include a secure tunnel.

16. The communications system of claim 15,
wherein making said decision includes deciding to communicate second communications session packets to the security function node via a secure tunnel; and
wherein the first processor further controls the first node to perform the following additional operation;
communicating packets corresponding to said second communications session to said security function node via a secure tunnel.

17. The communications system of claim 16, wherein the second processor further controls the security function node to perform the following additional operations:
receiving packets corresponding to the second communications session via said secure tunnel in encrypted form;
recovering packets corresponding to the second communications session by decrypting the received packets corresponding to the second communications session; and
forwarding recovered packets corresponding to the second communications session to an end node of said second communications session.

18. The communications system of claim 17, wherein the first processor further controls the first node to perform the following additional operation:
making a decision based on the application type of the first communications session whether to communicate packets corresponding to the first communications session to said security function node via a secure tunnel or by splitting the packets and sending first portions of packets of the first communications session to the security function node via a secure tunnel and second portions of packets corresponding to the first communications session to the security function node via a communications path which does not include a secure tunnel.

19. The communications system of claim 12,
wherein the second packet portion includes the portion of said first packet payload not included in said first packet portion, said portion of said first packet payload not included in said first packet portion including more bits of said payload of the first packet than were included in said first packet portion.

20. A non-transitory computer readable medium including a first set of computer executable instructions which when executed by a processor of a first node cause the first node to perform the steps of:
- identifying packets at the first node corresponding to a first communications session, said first communications session corresponding to a first application type;
- segmenting, at the first node, at least a first packet corresponding to the first communications session into at least a first packet portion and a second packet portion, said first packet including a first packet header and a first packet payload, said first packet portion including at least a portion of said first packet header, said second packet portion including at least a portion of said first packet payload;
- communicating, in encrypted form, the first packet portion from the first node to a security function node;
- communicating, in unencrypted form, the second packet portion from the first node to the security function node;
- wherein said communicating, in encrypted form, the first packet portion includes communicating the first packet portion with a first packet identifier;
- wherein communicating, in unencrypted form, the second packet portion includes communicating the second packet portion with the first packet identifier; and
- wherein the first packet portion includes the header portion of said first packet and a first portion of the payload of said first packet.

* * * * *